United States Patent [19]
Morita et al.

[11] Patent Number: 5,832,470
[45] Date of Patent: *Nov. 3, 1998

[54] METHOD AND APPARATUS FOR CLASSIFYING DOCUMENT INFORMATION

[75] Inventors: Takako Morita, Sagamihara; Junichi Higashino, Musashimurayama; Yoshiki Matsuda; Tetsuya Hashimoto, both of Yokohama, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 536,258

[22] Filed: Sep. 29, 1995

[30] Foreign Application Priority Data

Sep. 30, 1994 [JP] Japan .................................. 6-236444
Sep. 8, 1995 [JP] Japan .................................. 7-231033

[51] Int. Cl.⁶ ........................................ G06F 17/30
[52] U.S. Cl. ........................... 707/1; 707/2; 707/3; 707/4
[58] Field of Search ..................... 395/601, 602, 395/700, 147, 603, 604; 382/54; 364/300, 401; 707/1, 2, 3, 4

[56] References Cited

U.S. PATENT DOCUMENTS

| | | | |
|---|---|---|---|
| 4,719,571 | 1/1988 | Rissanen et al. | 364/300 |
| 4,760,606 | 7/1988 | Lesnick et al. | 382/48 |
| 4,958,284 | 9/1990 | Bishop et al. | 364/419 |
| 5,168,533 | 12/1992 | Kato et al. | 382/54 |
| 5,201,047 | 4/1993 | Maki et al. | 395/601 |
| 5,355,497 | 10/1994 | Cohen-Levy | 395/700 |
| 5,367,672 | 11/1994 | Takagi | 707/3 |
| 5,428,727 | 6/1995 | Kurosu et al. | 395/147 |
| 5,463,773 | 10/1995 | Sakakibara et al. | 395/604 |
| 5,508,912 | 4/1996 | Schneiderman | 364/401 |
| 5,519,865 | 5/1996 | Kondo et al. | 395/601 |
| 5,581,752 | 12/1996 | Innoue et al. | 395/601 |
| 5,590,317 | 12/1996 | Iguchi et al. | 395/602 |

FOREIGN PATENT DOCUMENTS

| | | |
|---|---|---|
| A-0 437 615 A1 | 12/1990 | European Pat. Off. . |
| A-0 457 707 | 11/1991 | European Pat. Off. . |
| A-0 542 429 A2 | 5/1993 | European Pat. Off. . |

OTHER PUBLICATIONS

H. Yuasa et al, An Information Broad–Catch System, Information Media Groupware, pp. 37–44 (NO English translation provided, Article provided in Japanese Language), 1993.

(List continued on next page.)

*Primary Examiner*—Thomas G. Black
*Assistant Examiner*—Frantz Coby
*Attorney, Agent, or Firm*—Antonelli, Terry, Stout & Kraus, LLP

[57] ABSTRACT

A document information classification method and apparatus for classifying a document group and arranging a classified result hierarchically on the basis of key words given to the document group and words appearing in documents without dependence on a prescribed classification system. The document group of a document data base and a key word group given to each document of a key word data base are managed by a data management unit. A document classification unit classifies documents into folders on the basis of individual key words and stores them. The folders having similar document groups are integrated. Whether the integration is effective or not is judged upon integration. Whether the inside of the integrated folder and the inside of unintegrated folders can be classified in detail or not is judged and a hierarchical classification system is prepared. A classified result is produced in CRT by a classified result output unit to provide environment in which a user can read out the classified result.

25 Claims, 41 Drawing Sheets

OTHER PUBLICATIONS

R.M. Stein, Profile of Next–Generation Distribution System, NIKEI BYTE, pp. 320–331 (No English translation provided, Article provided in Japanese Language), Nov. 1991.

K. Tsuda, et al., A Term Clustering Method Using Eigenvectors of Occurence Matrix, Natural Language Processing, pp. 41–48 (No English translation provided, Article provided in Japanese Langugae).

JP–A–5–28198, Abstract Only Translation, Dec. 1993.

JP–A–5_324726, Abstract Only Translation, Feb. 1993.

FIG.10

INTERFOLDER COINCIDENT
DOCUMENT NUMBER
MANAGEMENT TABLE 1001

| FOLDER IDENTIFICATION NUMBER | FOLDER IDENTIFICATION NUMBER | NUMBER OF COINCIDENT DOCUMENTS | INTEGRATED FLAG |
|---|---|---|---|
| 0 | 1 | 5 | INTEGRATED |
| | | | |
| | | | |
| | | | |
| | | | |

| | 0 | 1 | 2 | 3 | 4 | • • • • • • • |
|---|---|---|---|---|---|---|
| 0 | | 10 | 9 | 9 | ⑧ | |
| 1 | 10 | | 8 | 7 | 5 | |
| 2 | 9 | 8 | | 2 | 1 | |
| 3 | 9 | 7 | 2 | | 1 | |
| 4 | 8 | 5 | 1 | 1 | | |
| ⋮ | | | | | | |

NUMBER OF DOCUMENTS 1103

← FOLDER IDENTIFICATION NUMBER 102

↑ FOLDER IDENTIFICATION NUMBER 1101

FIG.12

INTERFOLDER COINCIDENT
DOCUMENT NUMBER
MANAGEMENT TABLE 1200

|  | FOLDER IDENTIFICATION NUMBER 1201 | FOLDER IDENTIFICATION NUMBER 1202 | NUMBER OF COINCIDENT DOCUMENTS 1203 | INTEGRATED FLAG 1204 |  |
|---|---|---|---|---|---|
| 0 | 0 | 1 | 10 | INTEGRATED | ⌐1205 |
| 1 | 3 | 5 | 9 |  | ⌐1214 |
| 2 | 5 | 1 | 9 | IMPOSSIBLE | ⌐1206 |
| 3 | 0 | 2 | 8 | IMPOSSIBLE | ⌐1207 |
| 4 | 0 | 3 | 8 | IMPOSSIBLE | ⌐1208 |
| 5 | 2 | 5 | 8 |  |  |
| 6 | 5 | 3 | 7 |  |  |
| 7 | 3 | 1 | 5 | IMPOSSIBLE | ⌐1209 |
| 8 | 0 | 4 | 2 | IMPOSSIBLE | ⌐1210 |
| 9 | 1 | 2 | 2 | IMPOSSIBLE | ⌐1211 |
| 10 | 6 | 5 | 1 |  |  |
| 11 | 2 | 4 | 1 |  |  |
| 12 | 1 | 4 | 1 | IMPOSSIBLE | ⌐1212 |
| 13 | 0 | 5 | 1 | IMPOSSIBLE | ⌐1213 |
|  |  |  |  |  |  |

FIG.15

WORD VECTOR TABLE 1500

KEY WORD IDENTIFICATION NUMBER 1502

|   | 0 | 1 | 2 | 3 | ... |
|---|---|---|---|---|---|
| 0 | 3 | 2 | 1 | 1 | |
| 1 | 1 | 13 | 2 | 0 | |
| 2 | 1 | 1 | 8 | 0 | |
| 3 | 0 | 1 | 3 | ②| |

DOCUMENT IDENTIFICATION NUMBER 1501

APPEARANCE FREQUENCY IN DOCUMENT 1503

FIG.22
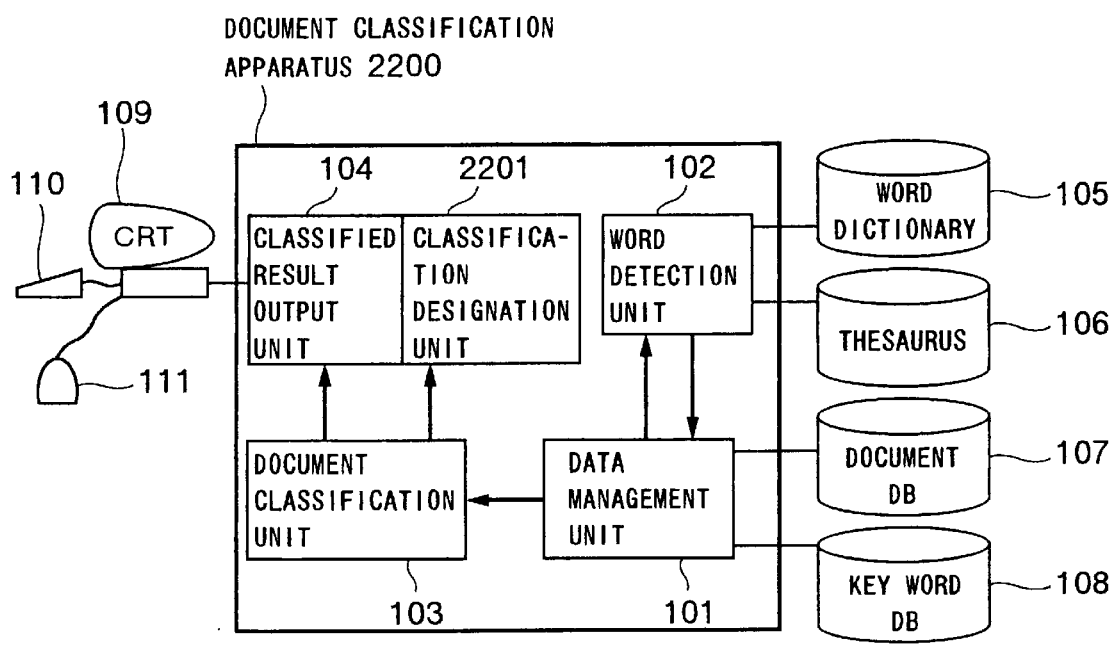
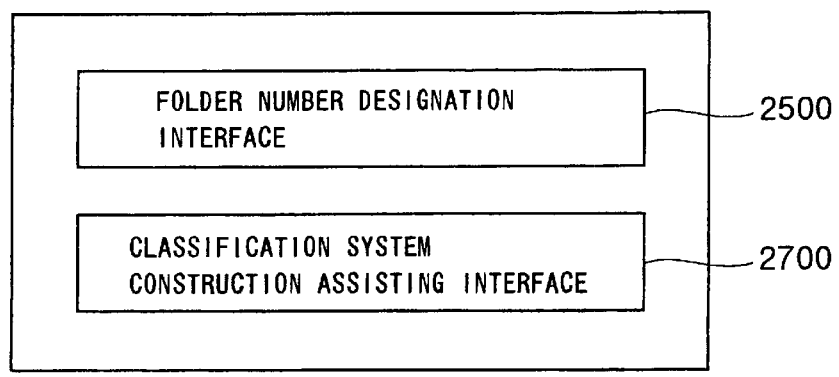

FIG.25
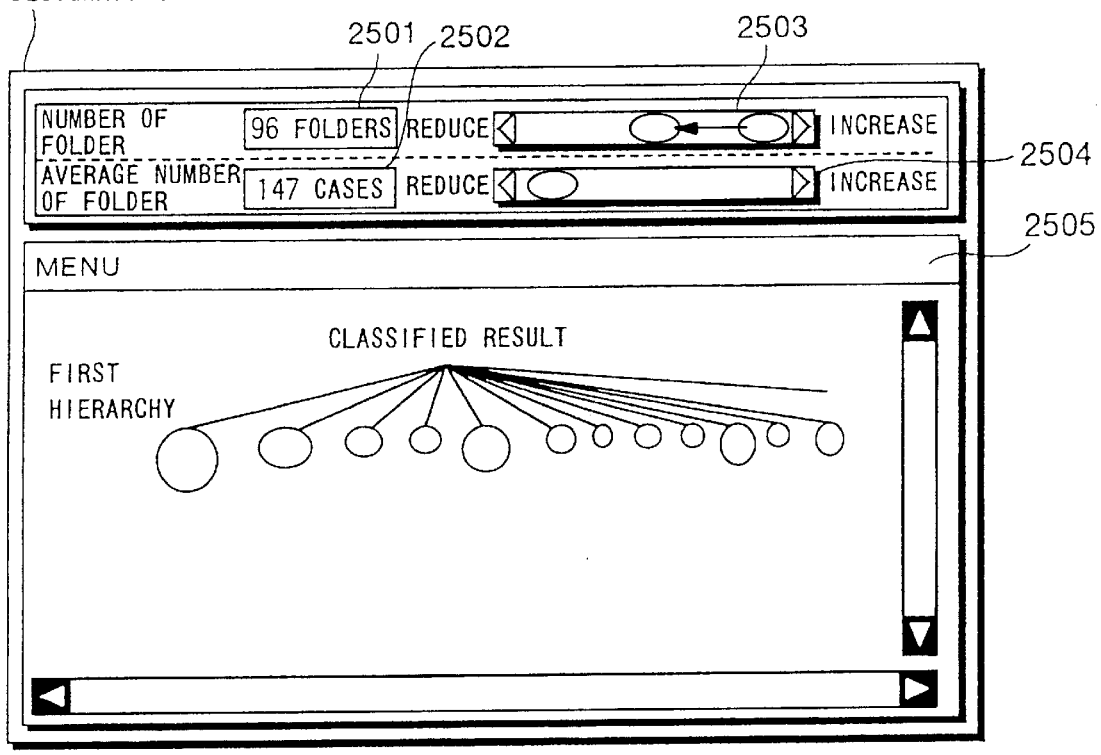
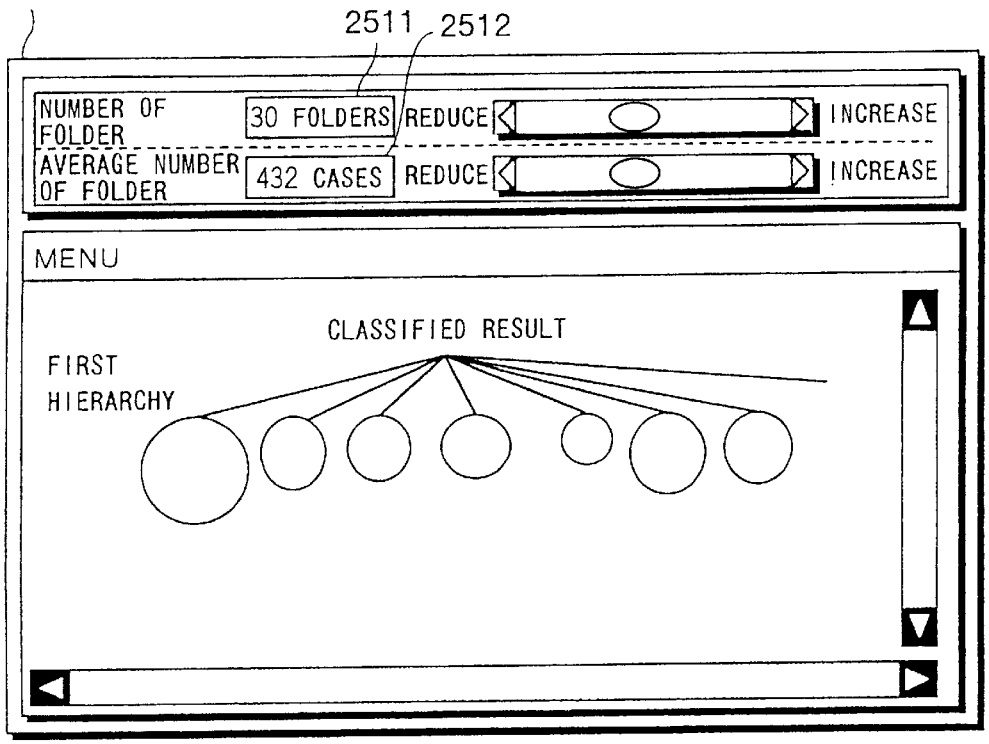

FIG.30

| ITEM | ITEM LEVEL |
|---|---|
| FIRST CHAPTER | GENERAL |
| SECOND CHAPTER | RATHER GENERAL |
| THIRD CHAPTER | SPECIAL |
| FOURTH CHAPTER | RATHER SPECIAL |

FIG.34
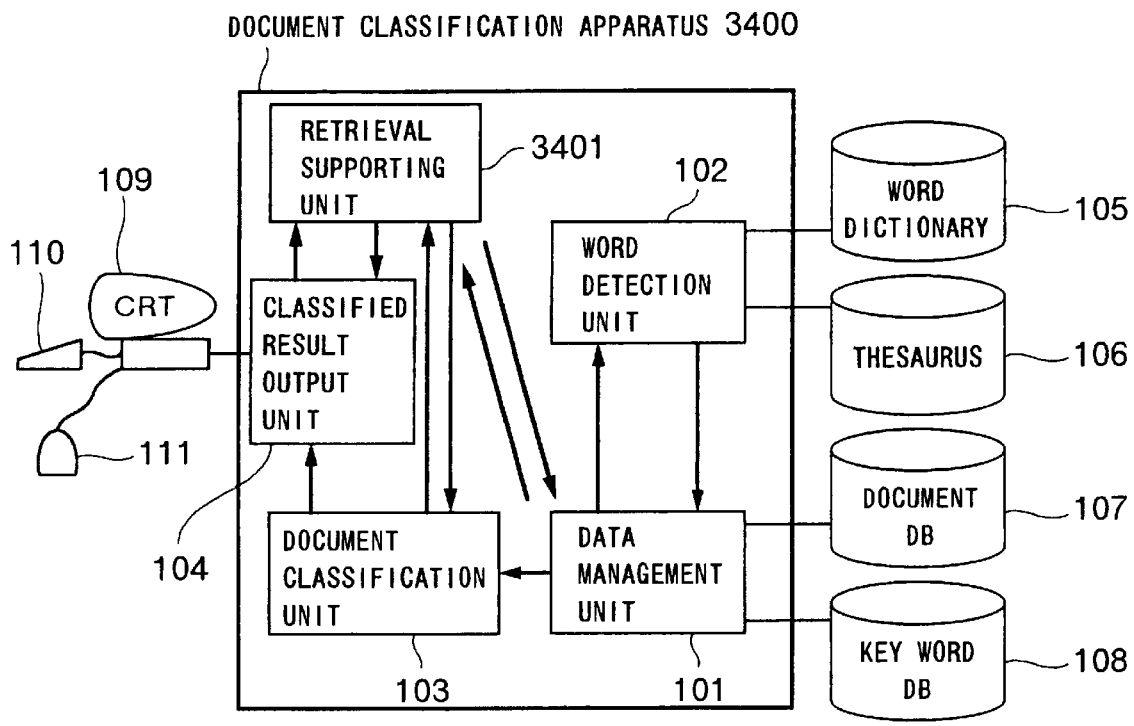
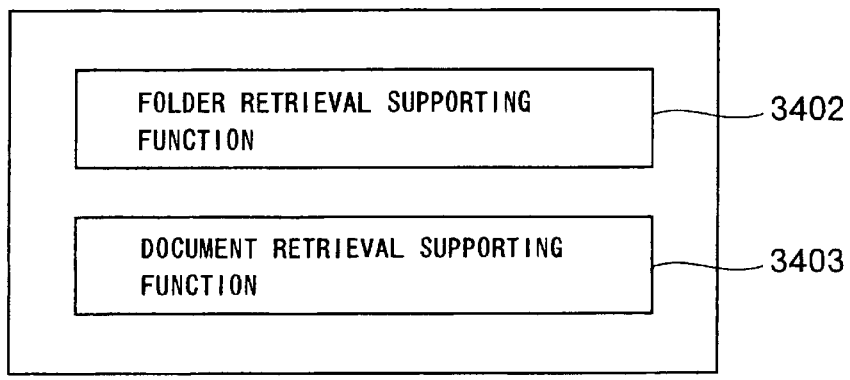

FIG.36

INTERFACE PICTURE 3600 OF CLASSIFIED RESULT

| DOCUMENT CLASSIFICATION SYSTEM | | RETRIEVAL SUPPORT | END |
|---|---|---|---|

CURRENT CLASSIFIED SITUATIONS

| FOLDER a<br>193 CASES | SUB FOLDER a<br>96 CASES | SUB-SUB-FOLDER a<br>31 CASES |
|---|---|---|
| FOLDER b<br>132 CASES | SUB FOLDER b<br>84 CASES | SUB-SUB-FOLDER b<br>22 CASES |
| FOLDER c<br>127 CASES | SUB FOLDER c<br>67 CASES | SUB-SUB-FOLDER c<br>21 CASES |
| FOLDER d<br>111 CASES | SUB FOLDER d<br>45 CASES | SUB-SUB-FOLDER d<br>16 CASES |
| FOLDER e<br>94 CASES | SUB FOLDER e<br>34 CASES | SUB-SUB-FOLDER e<br>12 CASES |
| FOLDER f<br>90 CASES | SUB FOLDER f<br>33 CASES | SUB-SUB-FOLDER f<br>9 CASES |

CONTENTS OF DOCUMENTS

DOCUMENT       PREPARED DATE :       SCORE :

AUXILIARY INFORMATION PICTURE 3610

FOLDER NUMBER: 30 FOLDERS       AVERAGE DOCUMENT NUMBER : 87 CASES

CLASSIFIED RESULT

FIRST HIERARCHY

FOLDER  a    b    c    d    e    f

FIG.38

INTERFACE PICTURE 3800 OF CLASSIFIED RESULT

| DOCUMENT CLASSIFICATION SYSTEM | | RETRIEVAL SUPPORT | END |
|---|---|---|---|

CURRENT CLASSIFIED SITUATIONS

| FOLDER a  193 CASES | SUB FOLDER a  96 CASES | DOCUMENT a  1995/01/21  30 POINTS |
|---|---|---|
| FOLDER b  132 CASES | SUB FOLDER b  84 CASES | DOCUMENT b  1994/12/23  25 POINTS |
| FOLDER c  127 CASES | SUB FOLDER c  67 CASES | DOCUMENT c  1994/11/12  22 POINTS |
| FOLDER d  111 CASES | SUB FOLDER d  45 CASES | DOCUMENT d  1995/02/24  17 POINTS |
| FOLDER e  94 CASES | SUB FOLDER e  34 CASES | DOCUMENT e  1995/03/23  16 POINTS |
| FOLDER f  90 CASES | SUB FOLDER f  33 CASES | DOCUMENT f  1994/12/20  15 POINTS |

CONTENTS OF DOCUMENTS

DOCUMENT a    PREPARED DATE:1995/03/23  SCORE:30 POINTS

AT(AUTOMOBILE TRANSMISSION)DEVELOPED BY THE ×× AUTOMOBILE INDUSTRY ADOPTS THE TECHNIQUE DEVELOPED FIRST IN THE WORLD WHICH RECOGNIZES THE DRIVER'S HABIT BY A COMPUTER ADOPTING A NEURAL NETWORK TO SELECT THE OPTIMUM SHIFT OPERATION···

AUXILIARY INFORMATION PICTURE 3810

DELETE

| DOCUMENT : | BEGINNING OF CONTENTS : |
|---|---|
| DOCUMENT a | "THE ×× AUTOMOBILE INDUSTRY HAS DEVELOPED···" |
| DOCUMENT b | "20TH DAY, A NEW PRODUCT OF ○○ COMPANY···" |
| DOCUMENT c | "THE INTERNET UTILIZING···" |
| DOCUMENT d | "MULTI-MEDIA PERSONAL COMPUTERS···" |
| DOCUMENT e | "THE △△ COMPANY'S PERSONAL COMPUTER···" |
| DOCUMENT f | "NEURAL NETWORK···" |
| DOCUMENT g | "THE ○○ COMPANY'S PERSONAL COMPUTER···" |
| DOCUMENT h | "INFORMATION THROUGH THE NETWORK···" |

FIG.40

INTERFACE PICTURE 4000
OF CLASSIFIED RESULT

| DOCUMENT CLASSIFICATION SYSTEM | | RETRIEVAL SUPPORT | END |
|---|---|---|---|
| CURRENT CLASSIFIED SITUATIONS ||||
| FOLDER a 193 CASES | SUB FOLDER a 71 CASES | DOCUMENT b 1994/12/23 25 POINTS ||
| FOLDER b 132 CASES | SUB FOLDER b 84 CASES | DOCUMENT c 1994/11/12 22 POINTS ||
| FOLDER c 127 CASES | SUB FOLDER c 67 CASES | DOCUMENT e 1995/03/23 16 POINTS ||
| FOLDER d 111 CASES | SUB FOLDER d 45 CASES | DOCUMENT g 1995/04/12 11 POINTS ||
| FOLDER e 94 CASES | SUB FOLDER e 34 CASES | DOCUMENT h 1995/02/11 11 POINTS ||
| FOLDER f 90 CASES | SUB FOLDER f 33 CASES | DOCUMENT i 1995/01/12 9 POINTS ||

CONTENTS OF DOCUMENTS

DOCUMENT        PREPARED DATE:         SCORE:

METHOD AND APPARATUS FOR CLASSIFYING DOCUMENT INFORMATION

BACKGROUND OF THE INVENTION

The present invention relates to a method and an apparatus for classifying document files stored in a computer hierarchically. Particularly, the present invention is applied to an information classifying system and a document filing system.

Arrangement of a computer network is properly preparing environment in which collection of information is performed by utilizing an information retrieval system and an electronic mail. New information arrives successively through the computer network and topics or subjects are changed momently. Availability of the latest information is recognized sufficiently, while the latest information is not effectively utilized under the present conditions due to the following problems:

(1) A retrieval expression for selecting desired information must be inputted with a logical expression. This is difficult for common users.
(2) In order to obtain desired information, it is difficult to prepare a proper retrieval expression.
(3) When collected information is increased, the information cannot be read or perused sufficiently and it is also impossible to select and read only necessary information thereof.

The wide-area information servers described in "Information Society in the 21st Century", Nikkei Byte, Nov. 1991, pp. 320–331 solves the problems in the above items (1) and (2) by the relevance feedback. In the relevance feedback, retrieval is performed on the basis of retrieval conditions designated by a user and when the user selects desired information from the retrieved results, the selected information is fed back to the retrieval conditions to improve the retrieval conditions. In this method, even if the retrieval conditions designated by the user are improper, learning is performed to polish the retrieval conditions.

In a system described in "Broad Catch System of Information", Information Processing Society of Japan, Report of Information Media Research Meeting 13-6 and Group Ware Research Meeting 4-6, Oct. 28, 1993, pp. 37–44, when a user registers the user's own interest as a key word in a system, a document pertinent to the interest is collected. Since it is not necessary to input any logical expression and the key word is merely registered, the problem in the above item (1) can be solved. Further, when the number of collected documents exceeds a fixed number, the documents are classified automatically. Contents of documents are expressed by word vectors constituted by a line of the frequency of appearance of key words and similarities between the word vectors are calculated to collect similar documents so that the documents are classified.

A document information retrieval apparatus described in JP-A-5-28198 retrieves a document by using retrieval information such as classification given to each of documents and words appearing in the documents as key words. When retrieval data such as a field and a word which the user wants to retrieve is inputted, contents are presumed to prepare a retrieval expression automatically and perform retrieval to thereby solve the problem in the above item (1). In preparation of the retrieval expression, an optimum logical expression is selected from previously registered retrieval logical expressions. Further, similarities of the retrieved documents to the retrieval data are calculated and the documents are arranged in accordance with the calculated similarities to thereby cope with the problem in the item (3).

In addition, in the prior art, documents can be classified with only one viewpoint. Accordingly, there is a problem that retrieval cannot be performed perfectly.

In the wide-area information servers described in the "Information Society in the 21st Century" described above, the system improves the retrieval condition by utilizing not only the retrieval condition designated by the user but also actual information satisfying a desire of the user by means of the relevance feedback method, so that the problems in the items (1) and (2) are solved.

The "Broad Catch System of Information" adopts the method in which a key word is registered without inputting a retrieval expression. However, since it is difficult for the user to register a key word which reflects the user's interest exactly, the problem in the item (2) is not solved. Further, it is premised that the automatic classification process of documents is started successively and accordingly the classification of documents is dependent on order of arrival of documents. Contents of information change momently and accordingly when the classification continues to be dependent on a classification system or a plurality of folders interrelated by a hierarchical relationship in a certain past time, an effective classification result cannot be produced and it becomes difficult to solve the problem in the item (3).

As described above, there is a problem that it is difficult for the user to establish a key word reflecting the user's interest exactly in the collection and retrieval process of documents.

As compared with the problem relative to the retrieval process, the classification process of documents has also the same problem in the work for previously establishing a classification system suggesting key words for classification. That is, if the classification continues to be dependent on one classification system, there is a problem that it cannot cope with variation of contents and an improper classification result is obtained.

On the other hand, in a document information retrieval apparatus described in JP-A-5-28198, retrieved documents are adapted to be arranged in order of availability thereof so that the documents can be reviewed in order of documents similar to a retrieval expression. However, in order to judge to which information it is effective, the user is required to confirm contents of the documents and accordingly the problem in the item (3) cannot be solved.

That is, only arrangement of retrieved results into a single hierarchy has a problem that documents having similar contents cannot be reviewed together or cannot be skipped over together without reading.

JP-A-5-324726 discloses measures for solving these problems. In this prior art, attention is paid to a certain key word and a document is classified in accordance with whether the key word is described in the document or not. The documents thus classified are subjected to the same process to thereby classify the documents hierarchically.

In this prior art, however, there is a problem that documents related to a plurality of fields cannot be classified with only one viewpoint.

Further, when this prior art is applied to general document data such as newspapers, there is a problem that the hierarchy becomes deeper and the number of classifications is increased explosively.

It is an object of the present invention to solve the above problems by providing a document classification method and apparatus for automatically classifying documents regardless of the existing classification system and arranging the classified results hierarchically.

SUMMARY OF THE INVENTION

In order to achieve the above object, the present invention comprises storing a plurality of documents and a key word group in each document of the documents previously, clustering documents including a key word into a single key word folder or a folder stored with retrieval conditions for one word to be retrieved for each stored key word, comparing documents in the single key word folder with each other to combine the single key word folders with each other to prepare a related key word folder or a folder stored with retrieved conditions for designating a plurality of related word to be retrieved, and classifying the plurality of previously stored documents into the related key word folders.

In the document information classification method and the document information classification apparatus of the present invention, the plurality of stored documents, the key word group including key words given to each document manually and words automatically extracted from each document, and the importance degree calculated from individual key words in the key word group are managed and the key word group and the importance degree are utilized for the classification process.

In a classification process based on one key word, the document group is stored in the single key word folder by means of the single key word classification process of documents relating to each key word. Documents having a plurality of key words are classified into a plurality of single key word folders in duplicate.

Then, it is judged whether the single key word folders including the similar document groups are integrated or not. When it is judged that the integration is possible, the integration is made on the basis of the related key word classification process and the key word folders are stored in the related key word folder.

Further, it is judged whether the related key word folders including the similar document group are integrated or not. When it is judged that the integration is possible, the integration of the related key word folders is repeated by related key word processing means.

Detailed classification judgment is performed for the inside of the single key word folder or the related key word folder. When the detailed classification is possible, the single key word process and the related key word classification process are utilized to hierarchically classify the inside of the folders. The detailed classification is recurrently repeated until stop of classification is judged. When the detailed classification is impossible, the relevance between documents is judged and the document having the low relevance is regarded as noise and is separated.

A name representative of the document group stored in the folder is given to each related key word folder and a folder name is given thereto.

Finally, each document can be stored in one or more classification exactly without dependence on the existing classification system and the hierarchical classification system can be prepared. The name representative of the classified result group can be given. Consequently, the user can easily detect a desired document from a large number of documents.

BRIEF DESCRIPTION OF THE DRAWINGS

FIG. 10 shows a data structure of an interfolder coincident document number management table of the first embodiment;

FIG. 11 shows a definite example of the interfolder coincident document number management table of the first embodiment;

FIG. 12 shows a definite example of an update process of the interfolder coincident document number management table produced upon integration of folders of the first embodiment;

FIG. 15 shows a definite example of a word vector table of the first embodiment;

FIG. 22 is a schematic diagram illustrating a system of a second embodiment of the present invention;

FIG. 25 shows a definite example of a folder number designation interface of the second embodiment;

FIG. 30 shows a definite example of items and item levels of the second embodiment;

FIG. 34 is a schematic diagram illustrating a system of a fourth embodiment;

FIG. 36 shows a definite example of a displayed picture of a classified result produced by a classified result output unit and an auxiliary information picture produced by a retrieval supporting unit of the fourth embodiment;

FIG. 38 shows a definite example of a displayed picture of a classified result produced by the classified result output unit and an auxiliary information picture produced by the retrieval supporting unit of the fourth embodiment;

FIG. 40 shows a definite example of a classified result processed by the document retrieval supporting function of the fourth embodiment.

DESCRIPTION OF THE PREFERRED EMBODIMENTS

A first embodiment of the present invention is now described.

An object to be processed by a document classification apparatus of the first embodiment is text files in a computer and the text files are supposed to be documents. A plurality of key words representative of contents of each document are given to each of documents and the key words are referred to as a key word group.

Figure 1:
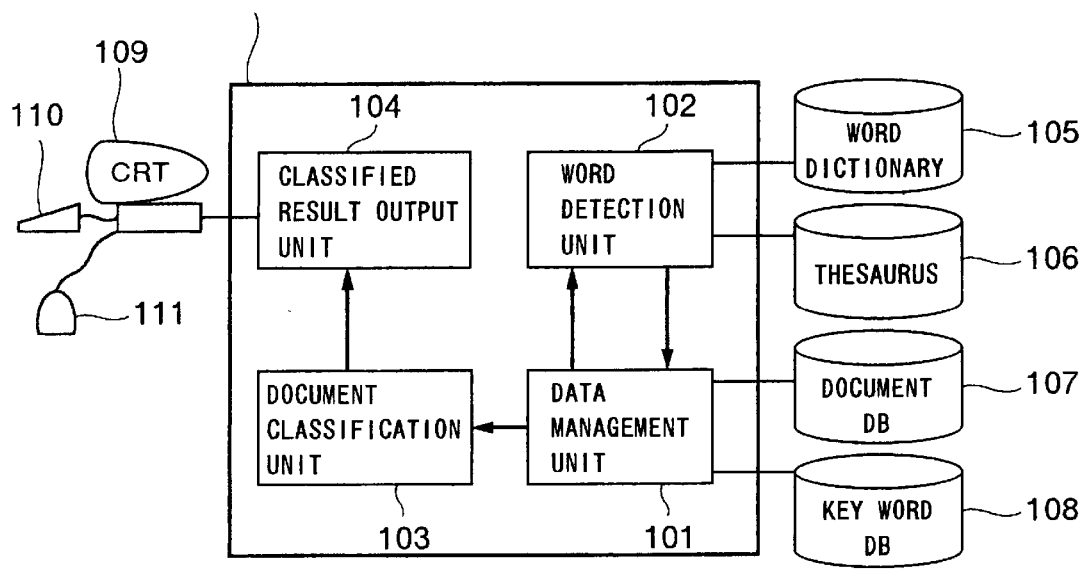
FIG. 1 is a schematic diagram illustrating a first embodiment of the present invention.

FIG. 1 schematically illustrates an example of the document classification apparatus of the first embodiment. The document classification apparatus 100 comprises a data management unit 101, a word detection unit 102, a document classification unit 103, and a classified result output unit 104 and further includes a word dictionary 105 for storing common terms, a thesaurus 106 for storing the higher and lower rank relation and synonymous information among terms, a document data base (DB) 107 for storing documents, a key word data base (DB) 108 for storing key word groups of documents, a CRT 109 constituting an output device, a key board 110 and a mouse 111 constituting input devices.

The data management unit 101 manages the document data base 107 and the key word data base 108 and performs input/output of documents and key word groups. Key words given previously by hand (referred to as manually given key words) can be stored in the key word data base 108. The manually given key words are not required to be stored in the data base, while in the first embodiment the ease where the manually given key words are stored is described by way of example.

The word detection unit 102 receives a document from the data management unit 101 and performs the morphemic analysis by utilizing the word dictionary 105 to extract words from the document. Alternatively, the word detection unit may utilize a method of dividing a document at each change point in types of characters to extract words, a method of examining the appearance frequency of a chunk of n characters in a document to extract the chunk of n characters having a meaning and the like. The extracted words are developed to synonyms and are converted into higher-rank words with reference to the thesaurus to produce synonym groups. The extracted words and the synonyms are combined to produce key words. The key words are delivered to the data management unit 101 and are added to the key word groups of documents in the key word data base 108.

Further, the word detection unit 102 calculates the degree of importance of each key word. The degree of importance is calculated on the basis of (1) the frequency of appearance of each word in regard to the total number of the appearance frequencies of the whole words and (2) an appearance position of each word in the title, the headline or caption, the paragraph or the like of the document. That is, the possibility that the title represents contents of a document is high and accordingly the degree of importance of words appearing in the title is increased.

The document classification unit 103 receives the key word groups of each document from the data management unit 101 and prepares a hierarchical classification system, so that the results thereof are delivered to the classified result output unit 104. Detail of the classification process will be described later.

The classified result output unit 104 receives the hierarchical classification system from the document classification unit 103 and displays an interface picture in the CRT 109.

Figure 2:
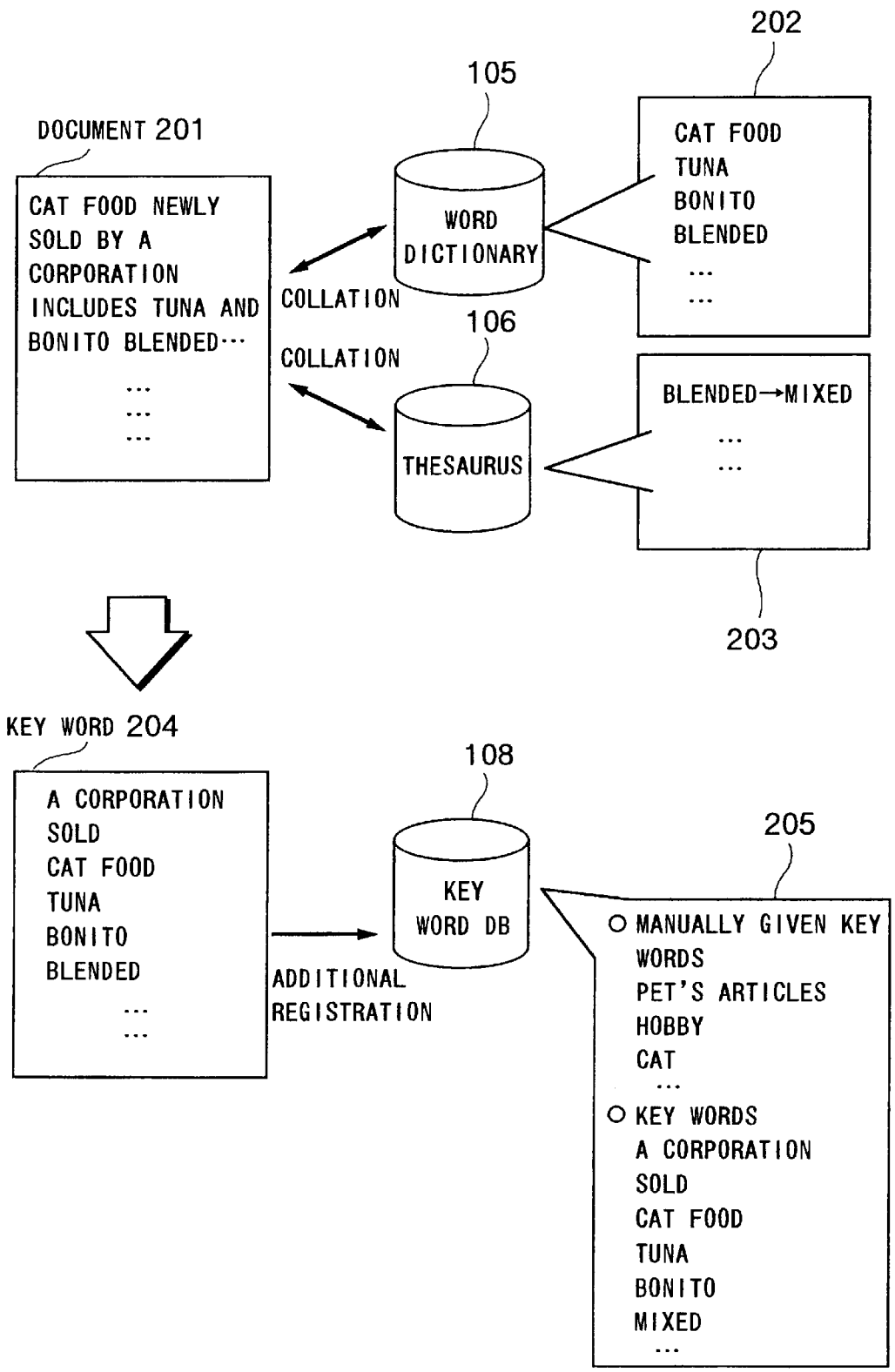
FIG. 2 is a diagram illustrating key words of the first embodiment.

FIG. 2 shows a definite example of the key words. The word detection unit 102 of FIG. 1 is described in detail. A word group 202 is first extracted from a document 201 with reference to the word dictionary 105. The word group 202 is developed to synonyms and higher-rank words with reference to the thesaurus 106. A synonym group 203 illustrates an example where a term of "blended" is developed to a synonym of "mixed". The development to the synonym is made in order to unify expression or description of key words. Then, key words 204 are prepared from the word group 202 and the synonym group 203 and are stored in a key word group 205 of the document 201 stored in the key word data base 108. The key word group 205 includes manually given key words and the key words 204 added thereto.

Detail of the document classification unit 103 is now described with reference to a flow chart of FIG. 3. An area in which the document is stored as a result of classification is named a folder and a plurality of documents stored in the folder is named a document group. Further, "preparing the folder" means ensuring an area for storing the classified document group.

First of all, a single key word classification process 301 for clustering documents having key words included in the key word group for each key word is performed. Then, a related key word classification process 302 for integrating sets of single key word folders including similar document groups in regard to single key word folders prepared by the single key word classification process 301 is performed. In step 303, whether sets of related key word folders including similar document groups in regard to related key word folders prepared by the related key word classification process 302 can be integrated or not is judged. The related key word folders are repeatedly integrated while the integration is possible. Whether detailed classification for information within the prepared single key word folders and related key word folders can be performed or not is examined (step 304) and hierarchical classification is repeated while detailed classification is possible (step 305). The hierarchical classification is performed for information within all of the folders in step 305.

Figure 3:
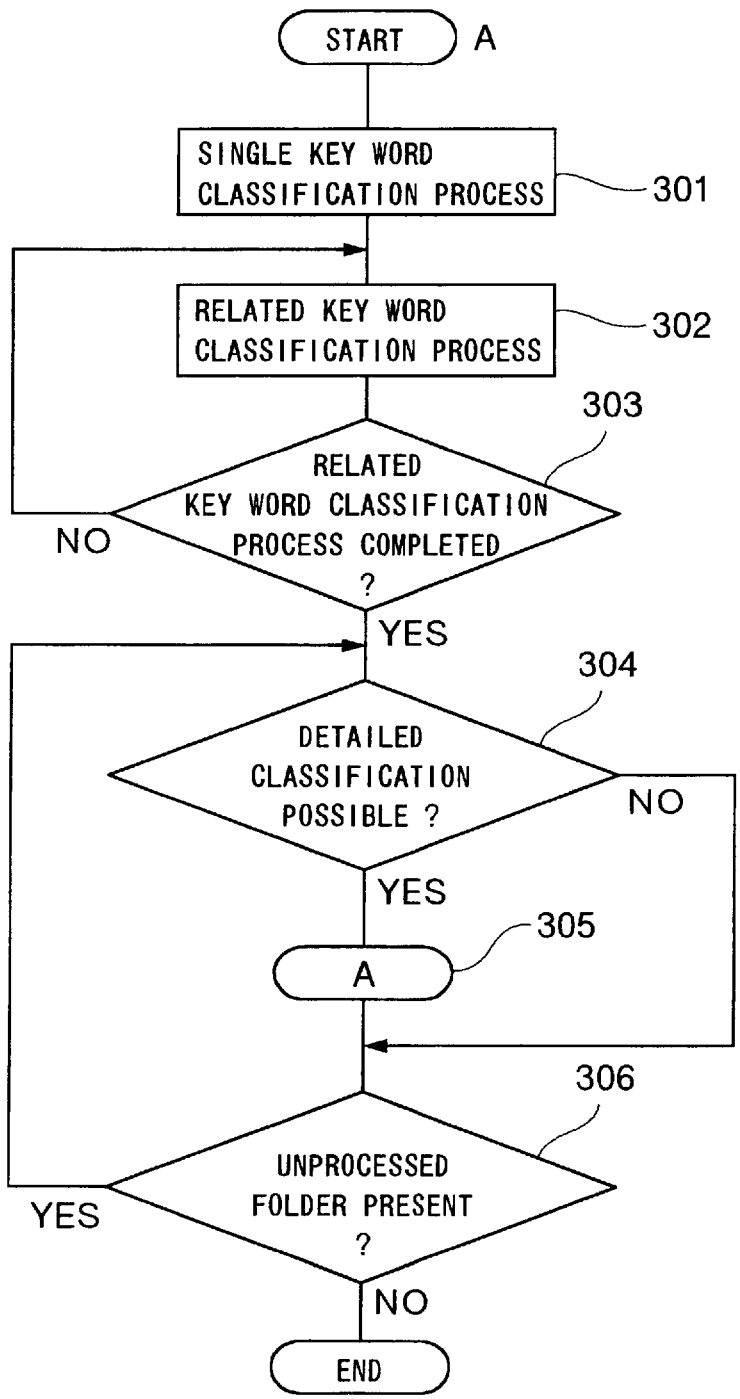
FIG. 3 is a flow chart showing a document classification process of the first embodiment.

Detail of the processes of FIG. 3 is now described.

Figure 4:
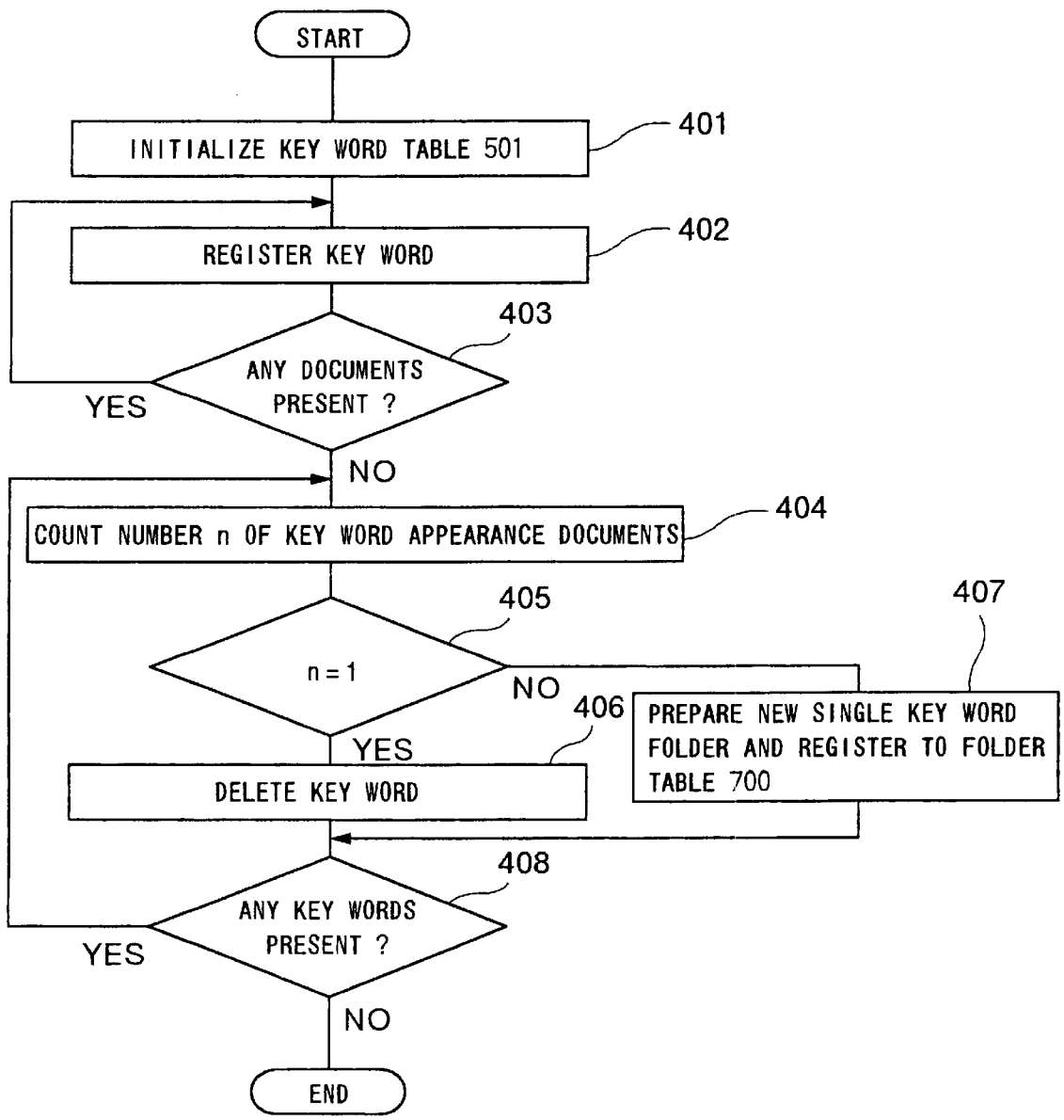
FIG. 4 is a flow chart showing a single key word classification process of the first embodiment.

Detail of the single key word classification process 301 of FIG. 3 is first described with reference to a flow chart of FIG. 4. A folder prepared by the single key word classification process 301 is referred to as a single key word folder.

In step 401, a table for managing key words is initialized. The table for managing key words is referred to as a key word table. In step 402, a key word group of one document is read out from the key word data base 108 of FIG. 1 and each key word is registered in the key word table. Key words of all documents are repeatedly registered (step 403). In step 404, the number of documents having each key word included in the key word group is counted for each key word. Judgment as to whether the number of documents is one or not is made (step 405). When it is one, the key word is excluded from the object to be processed since the key word included in only one document is not useful for judgment of the relation to other documents in the classification. When the number of documents is not one, a single key word folder having the same name as the key word is prepared and a document group having the key words included in the key word group is stored in the single key word folder. Further, the name of the single key word folder is registered in a table for managing the folder (step 407). The table for managing the folder is referred to as a folder table. In step 408, the process for preparing the above single key word folder is repeatedly performed for all of the key words.

Figure 5:
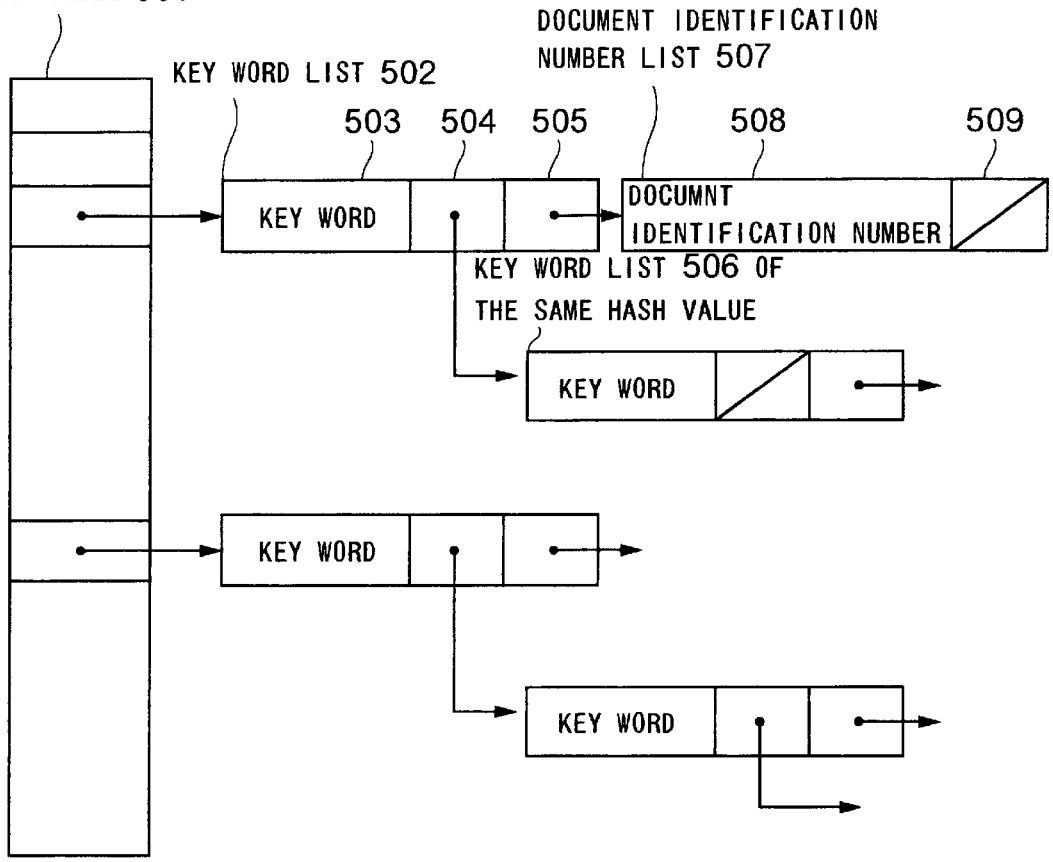
FIG. 5 shows a data structure of a key word table of the first embodiment.

Referring now to FIG. 5, the key word table is described. Each entry of the key word table 501 indicates a key word list 502. The entry is determined by a value of a hash function having the key word as an input. The key word list 502 includes a combination of a key word 503, a pointer 504 to the key word list having the same Hash value, and a pointer 505 to a document identification list. The pointer 504 indicates a key word list 506 of the same Hash value and indicates that the key word of the key word list 506 having the same Hash value as the key word list 502 has the same Hash value. The pointer 505 indicates a document identification number list 507 and is coupled with a document group including the key word 503. The document identification number list 507 includes a combination of a number 508 for identifying a document, and a pointer 509 to a next document identification number list. The number of documents including key words is obtained by tracing the document identification number list 505 of the key word table 501.

Figure 6:
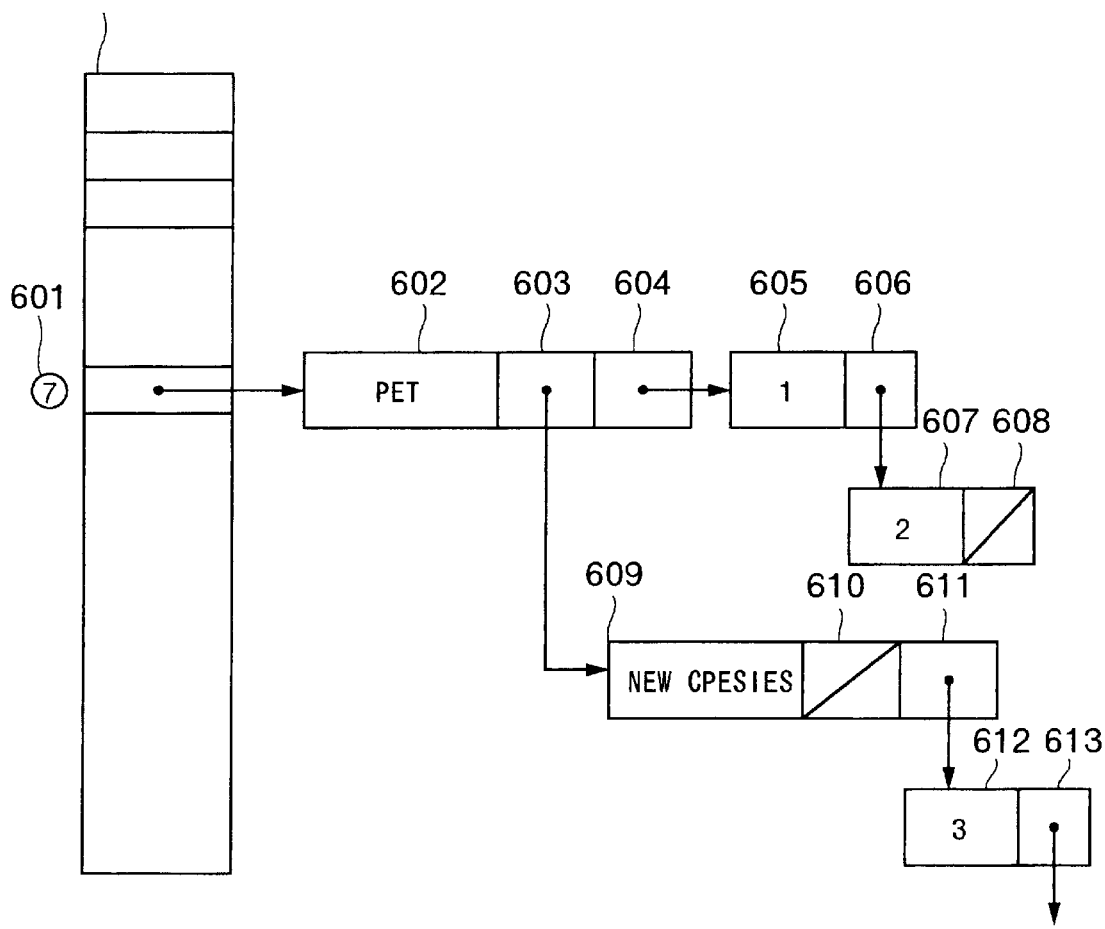
FIG. 6 shows a definite example of the key word table of the first embodiment.

In a definite example of a key word table shown in FIG. 6, a key word list is connected to a seventh entry 601 of a key word table 600. A pointer 603 indicates that a key word list for a key word 609 of "new species" is connected to a key word list for a key word 602 of "pet" and a point 610 indicates that there is not a connection of a key word list any longer. A pointer 604 indicates the document identification number 1 (605) which is one document identification number list including a key word of "pet" and a pointer 606 further indicates the document identification number 2 (607). A pointer 608 indicates that there is not a document group including a key word of "pet" any longer. Similarly, a pointer 611 indicates the document identification number 3 (612) of the document identification number list including a key word of "new species". A pointer 613 indicates that the document identification number list is further connected.

Figure 7:
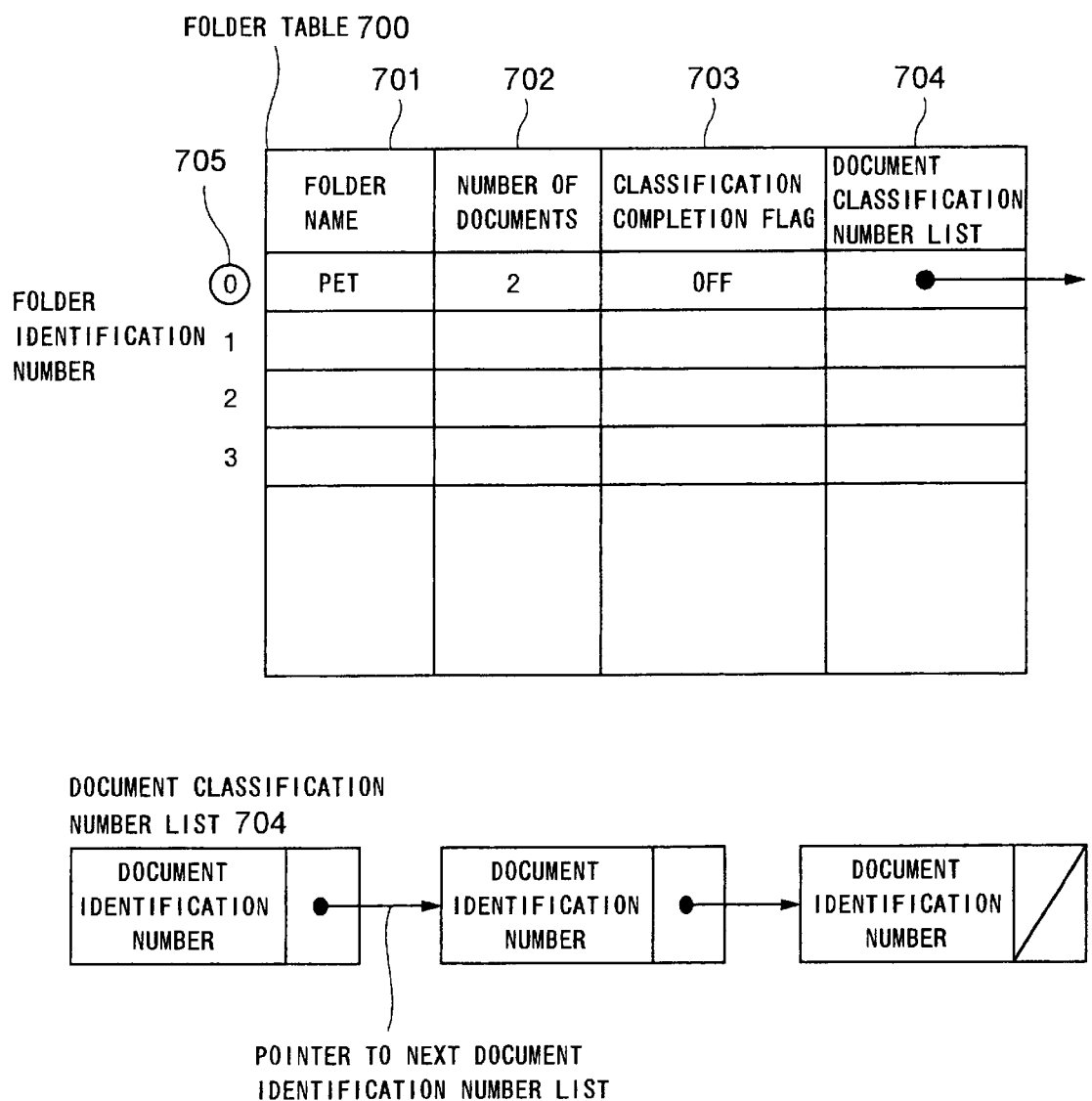
FIG. 7 shows a data structure of a folder table of the first embodiment.

Referring now to FIG. 7, a folder table is described. The folder table 700 includes a combination of a folder name 701, the number of documents 702, a classification completion flag 703 and a document identification number list 704. The classification completion flag 703 is a flag for storing whether the classification is performed or not and will be described in detail later. The document identification number list 704 is equal to the document identification number list 507 of the key word table 501 of FIG. 5. The 0-th entry 705 of the folder table 700 includes a folder of "pet", in which two documents are stored, and indicates that the classification of the folder is OFF (not completed) and the document identification number list is connected.

Figure 8:
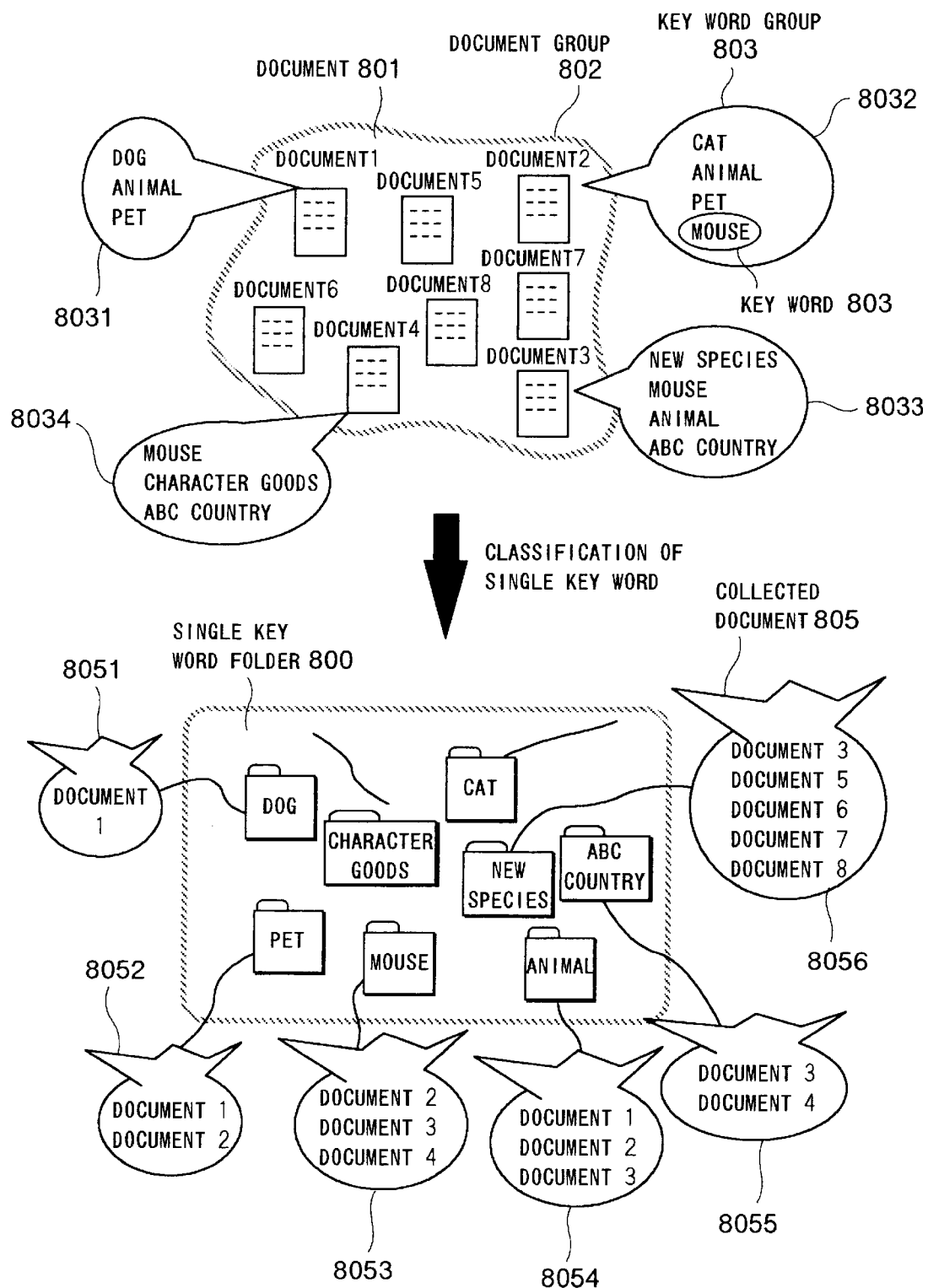
FIG. 8 shows a definite example of the single key word classification process of the first embodiment.

The single key word classification process 301 of FIG. 3 is now described with reference to a definite example of the single key word classification process shown in FIG. 8. A document 801 is stored in the document data base 107 of FIG. 1 and forms a document group 802. A key word group 803 is given to each document and is a gathering of individual key words 804. Numeral 8031 denotes a key word group of a document 1 including key words of "dog", "animal" and "pet". Numeral 8032 denotes a key word group of a document 2 including key words of "cat", "animal", "pet" and "mouse". Numeral 8033 denotes a key word group of a document 3 including key words of "new species", "mouse", "animal" and "ABC country". Numeral 8034 denotes a key word group of a document 4 including key words of "mouse", "character goods" and "ABC country". Other documents 5, 6, 7 and 8 also include key word groups similarly. When the document group 802 is subjected to the single key word process, the document group 802 is developed to a group of single key word folders 800. The single key word folders are prepared with the same names as the key words of "dog", "cat", "character goods", "new species", "ABC country", "pet", "mouse" and "animal", respectively. Stored in each of the single key word folder is a collected document 805.

For example, numeral 8051 denotes a collected document of a single key word folder "dog" including the document 1. Numeral 8052 denotes a collected document of a single key word folder "pet" in which the documents 1 and 2 are stored. Numeral 8053 denotes a collected document of a single key word folder "mouse" in which the documents 2, 3 and 4 are stored. Numeral 8054 denotes a collected document of a single key word folder "animal" in which the documents 1, 2 and 3 are stored. Numeral 8055 denotes a collected document of a single key word folder "ABC country" in which the documents 3 and 4 are stored. Numeral 8056 denotes a collected document of a single key word folder "new species" in which the documents 3, 5, 6, 7 and 8 are stored.

The related key word process 302 of FIG. 3 is now described in detail with reference to a flow chart of FIG. 9. A folder prepared by the related key word process 302 is hereinafter referred to as a related key word folder.

In step 901, a table for managing the number of coincident documents between folders is initialized. The table for managing the number of coincident documents between folders is referred to as an interfolder coincident document number management table. Coincident documents between two single key word folders are counted and the count is registered in the interfolder coincident document number management table (step 902). In step 903, the number of coincident documents between all single key word folders are registered in the coincident document management table. In step 904, contents in the interfolder coincident document number management table are arranged in order of the descent of the number of coincident documents and whether a set of single key word folders at the top of the table, that is, a set of single key word folders having the maximum number of coincident documents between folders can be integrated or not is examined (step 905). Detail of step 905 is described later.

When the integration is possible, a related key word folder is prepared and document groups of two integrated single key word folders are stored therein. A name of the related key word folder is registered in the folder table 700 of FIG. 7 and the two integrated single key word folders are deleted from the folder table 700 (step 907). The name of the related key word folder is constituted by two combined names of the two integrated single key word folders.

At this time, the names of the single key word folders are arranged in order of the number of documents to indicate what key words are included in the document group in the related key word folders largely. Further, in step 908, completion of the integration is written in the interfolder coincident document number management table and the interfolder coincident document number management table is updated.

When the integration is impossible or when the integration is completed, the integration process is repeated for single key word folders which are not subjected to the integration process from the top to the end of the interfolder coincident document number management table (step 906).

The above described interfolder coincident document number management table is shown in FIG. 10 and is described in detail.

The interfolder coincident document number management table 1001 includes a combination of identification numbers 1002 and 1003 of two folders of which the number of coincident documents are examined, the number of coincident documents 1004 and an integrated flag 1005. In the example of FIG. 10, the number of coincident documents between the folder identification numbers 0 and 1 is five. The integrated flag 1005 is a flag for storing "whether the integration of the folder is completed or not" or "the integration of the folder is impossible", and "integrated" means that the integration is completed and "impossible" means that the integration is impossible.

FIG. 11 shows a definite example of the interfolder coincident document number management table. The identification numbers 1101 and the 1102 of all the single key word folders are listed and the number of coincident documents between two folders are investigated and registered. For example, it is shown that the number of coincident documents of documents 0 and 4 is 8. The number of coincident documents is obtained by tracing and comparing the document identification list 704 of the folder table 700.

FIG. 12 shows a definite example of the update process of the inter folder coincident document number management table and description thereof is now made in detail. The interfolder coincident document number management table 1200 shows a state that the processes have been completed until step 904 of FIG. 9. The integration process of the folders is started from the top, that is, the 0-th entry of the interfolder coincident document number management table. When it is judged that the integration in respect to the folder identification numbers 0 and 1 is possible, the integration is performed (step 905) and "integrated" is written in the integrated flag 1205 (step 908). When the integration in respect to the folder identification numbers 0 and 1 is performed, the integrated flags 1206 to 1213 relative to the numbers 0 and 1 are set to "impossible". Then, the integration process for the next entry or the 1st entry of the interfolder coincident document number management table is performed (step 906). At this time, it is confirmed that the integrated flag is not "impossible". When it is "impossible", the integration process for one of the set of single key word folders of the 1st entry has been already performed and accordingly the integration cannot be performed. In FIG. 12, since the integrated flag 1214 is not "impossible", the integration can be performed. In the first embodiment, the integration process is performed in order from the top of the interfolder coincident document number management table and accordingly the "integrated" entry does not appear behind the entry being processed.

Figure 9:
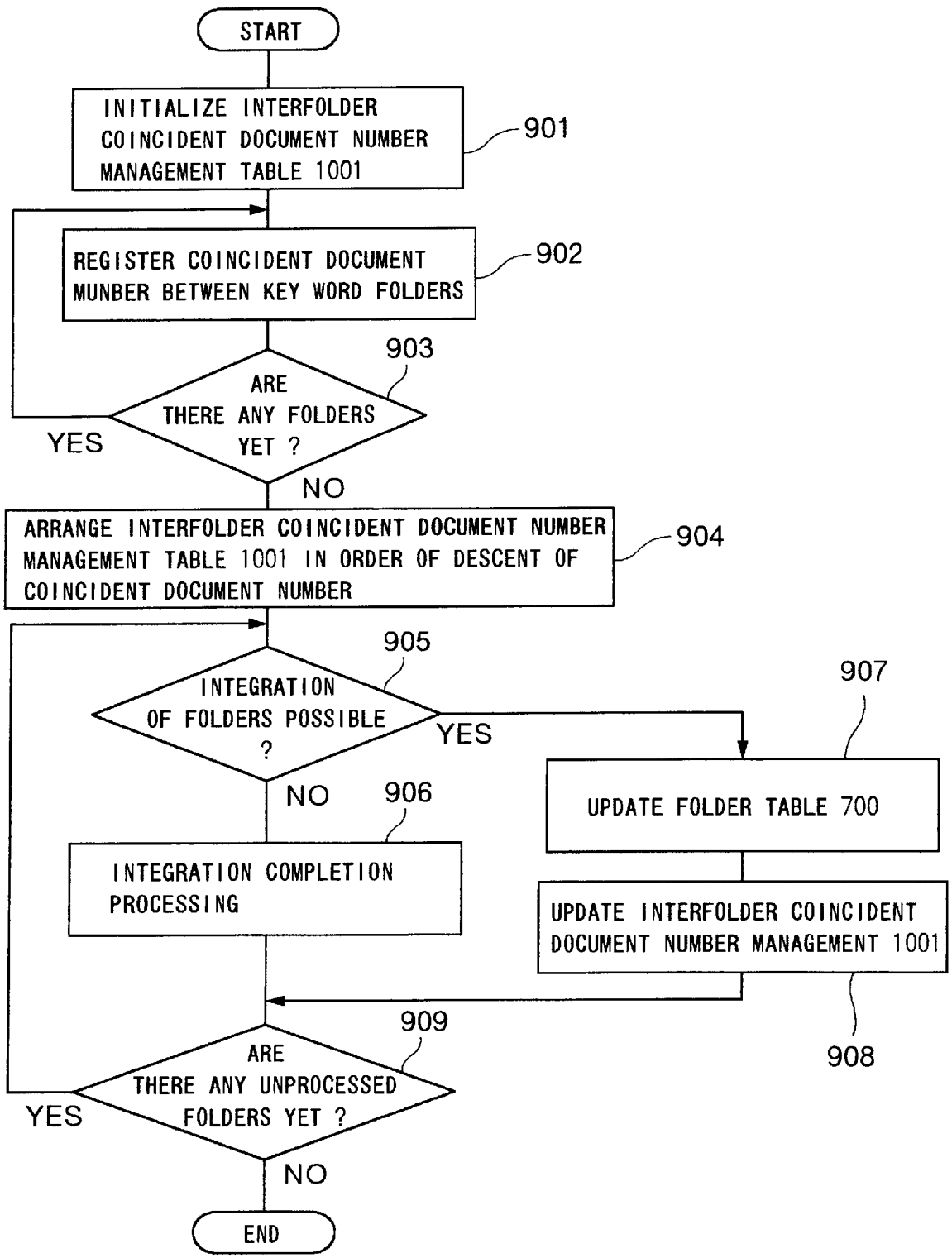
FIG. 9 is a flow chart showing a related key word classification process of the first embodiment.
Figure 13:
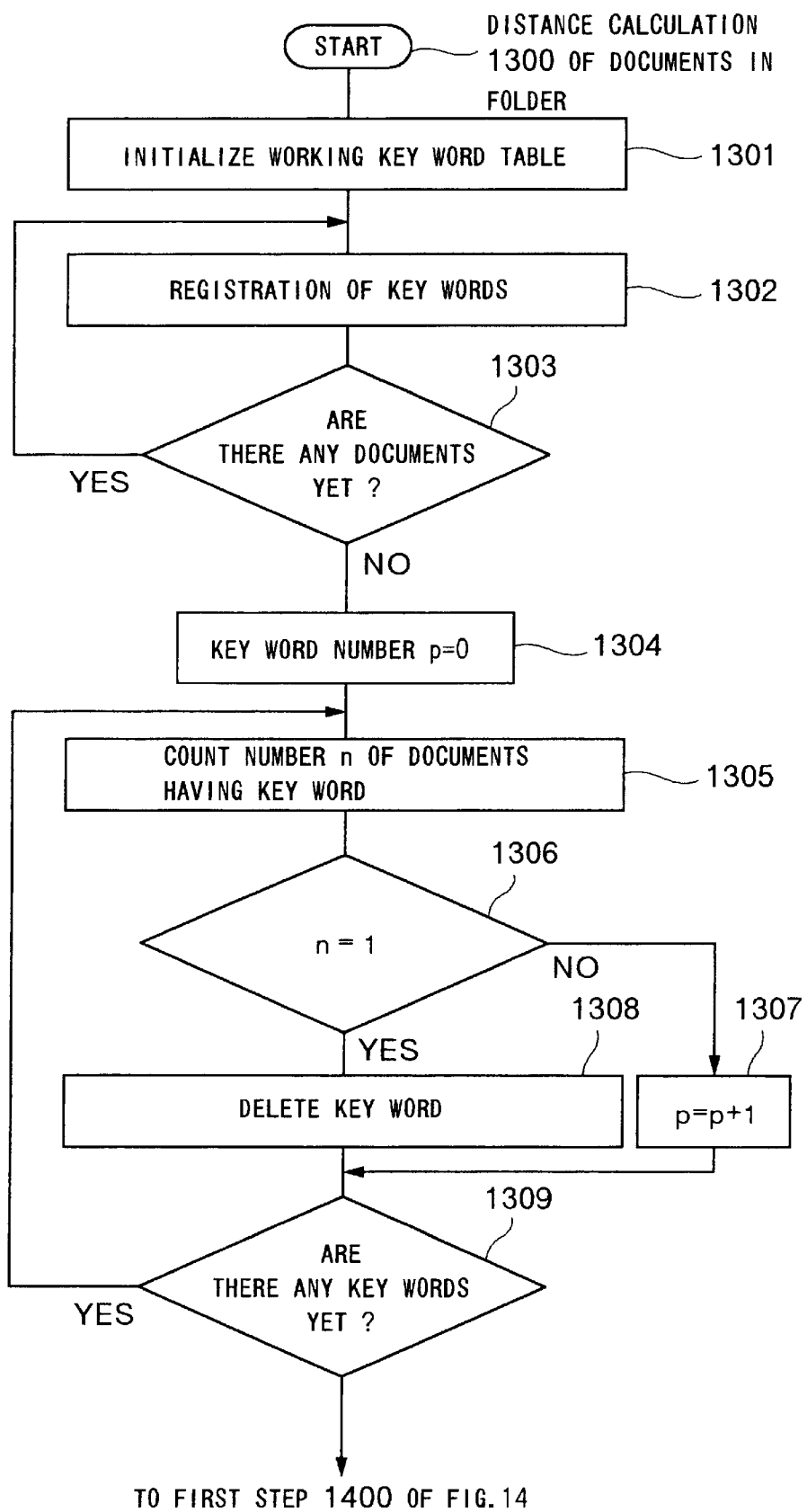
FIG. 13 is a flow chart showing calculation of a distance of document information in a folder of the first embodiment.

Referring now to a flow chart of FIG. 13, the integration judgment process of folders in step 905 of FIG. 9 is described in detail.

A set of folders to be integrated is determined on condition that "the number of coincident documents is maximum". Whether the folders are to be integrated or not requires to examine whether the integrated result is an effective classification or not and judgment is made by comparing the state before integration with the integrated state. In the first embodiment, the distance calculation process of documents in a folder 1300 shown in FIG. 13 is applied.

In step 1301 of FIG. 13, a working key word table used temporarily in the distance calculation process 1300 of documents in a folder is initialized. A data format of the working table is the same as the key word table 501 of FIG. 5. Registration of key words is made for documents stored in the folder (step 1302) and is repeated for all documents in the folder (step 1303). A key word number p initialized for counting of the number of key words (step 1304). The key word having the number of documents equal to 1 is deleted from the working key word table (step 1308) and when the number of documents exceeds 1, the key word number p is incremented by one (step 1307). The processes subsequent to the step 1305 are repeated (step 1309) and selection of key words included in two or more documents of key words included in the document group in the folder is completed. Then, the process proceeds to step 1400 of FIG. 14.

Figure 14:
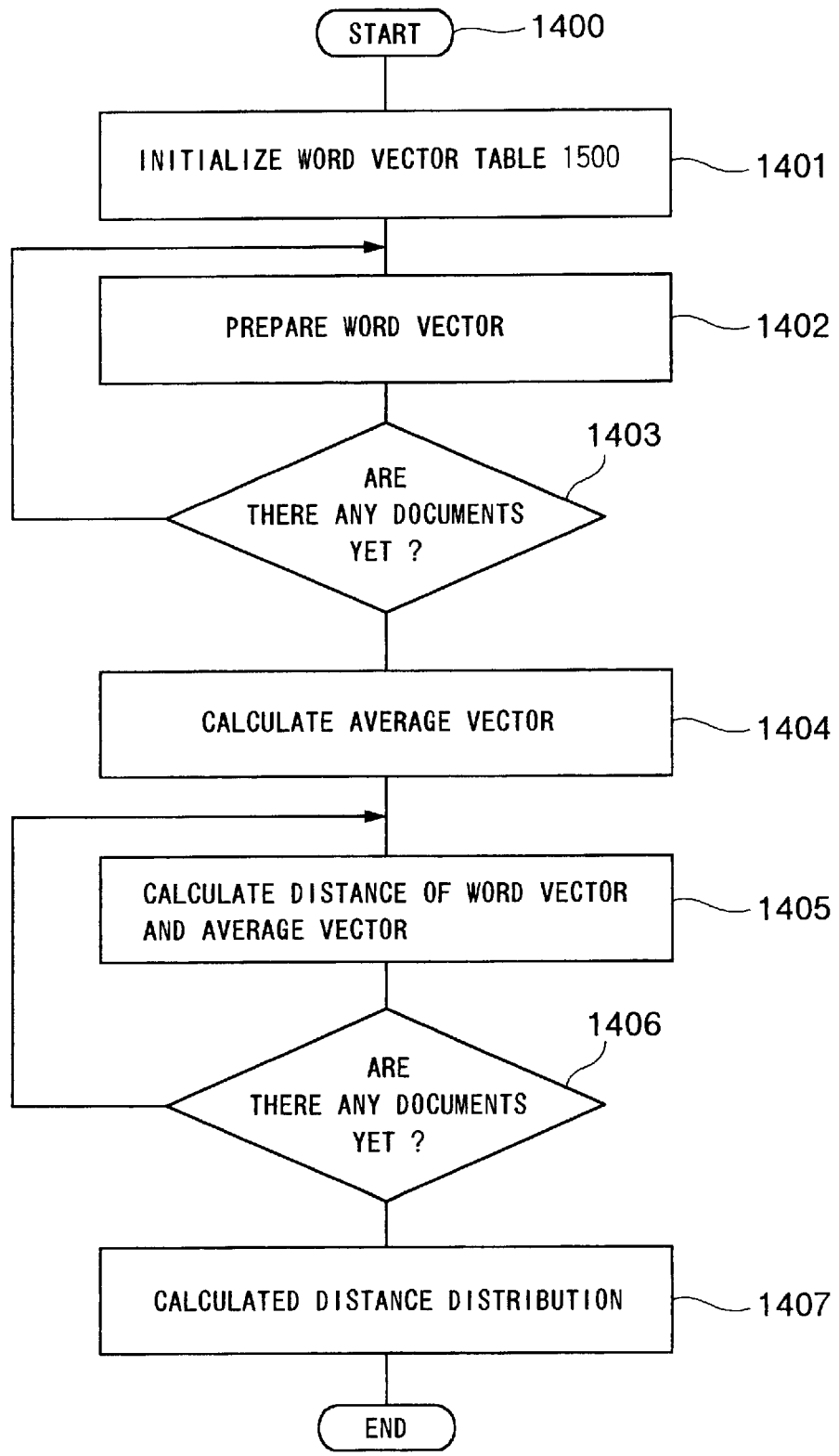
FIG. 14 is a flow chart showing calculation of a distance of document information in a folder of the first embodiment.

In step 1401 of FIG. 14, a table for managing a word vector is initialized.

A word vector Wi is a line of "products of the appearance frequency of key word and the importance degree of key word" and can be expressed concretely as follows:

Word Vector Wi=(F1*V1, F2*V2, . . . , Fj*Vj, . . . , Fp*Vp)

where i represents the document identification number, j the key word identification number, p the number of key words, Fj the appearance frequency of key word j and Vj the importance degree of key word j.

The importance degree is to be given by the word detection unit 102 of FIG. 1 and the larger the value the higher the importance degree. The table for managing the word vector is referred to as a word vector table.

In step 1402, a product of the appearance frequency of each key word and the importance degree of each key word given by the word detection unit 102 is calculated and registered in the word vector table. This process is repeated for each document (step 1403). Further, in step 1404, an average vector of word vectors in each document is calculated. In the first embodiment, the average vector is defined by the following expression:

Average Vector Wa=Σ Wi/n where 1<=i<=n, i represents the document identification number and n represents the number of documents.

In step 1405, a distance of the word vector Wi (1<=i<= number of documents) and the average vector Wa of each document is calculated. The distance between the vectors is to judge the nearness of the vectors and is defined in the first embodiment by the following equation. Word vectors of documents Di and Dj are Wi and Wj, respectively, an angle between word vectors Wi and Wj is θ and a distance between the documents Di and Dj is d(Di, Dj).

$$d(Di, Dj)=1-Wi \cdot Wj/|Wi|*|Wj|=1-\cos \theta$$

where • represents the inner product, * the product and |wi| the magnitude of Wi.

d(Di, Dj) has a value in the range of 0<=d(Di, Dj)<=1 and the nearer the distance between vectors the smaller the value. When the documents are coincident, the distance is 0.

The distance calculation of the word vector and the average vector is repeated for all the documents (step 1406). In next step 1407, a distance distribution is calculated from the distance of all average vectors and each document. The distance distribution is defined by the following expression as (1) an average distance and (2) a variance.

Average Distance da=Σ di/n

Variance σ=Σ ((di−da)*(di−da))/(n−1)

where 1<=i<=n, i represents the document identification number, n the number of documents, and di a distance of the document of the document identification number i and the average vector.

The average value of the distance distribution investigated separately in respect to two single key word folders which are not integrated yet is compared with the distance distribution of the integrated related key word folder to thereby judge whether the integration is possible or not.

In the first embodiment, (1) and (2) are defined concretely by the following equation:
(1) |d2−d1|>Td (d1 represents an average value of an average distance of the two single key word folders which are not integrated yet, d2 represents an integrated average distance, |x| represents an average value of x, and Td represents a threshold value)
(2) $\sigma_2/\sigma_1$ >=Tσ ($\sigma_1$ represents an average dispersion value of the two single key word folders which are not integrated yet, $\sigma_2$ represents an integrated dispersion value, and Tσ represents a threshold value)

When the condition of (1) or (2) is satisfied, it is judged that the integration is impossible. Several kinds of threshold values Td and Tσ are determined by an initial experiment and the values suitable for situation of the distance distribution of the document group in the folder are selected.

A definite example of the word vector table of FIG. 15 is used to be described in detail. The word vector table 1500 is a two-dimensional table having the vertical axis indicating the document identification number and the horizontal axis indicating the key word identification number. For example, an entry 1503 indicates that a product of the appearance frequency and the importance degree of a key word of the key word identification number 3 in the document of the document identification number 3 is 2. A calculation example of a distance of the word vector and the average vector is described with reference to FIG. 15. In order to simplify description, when the importance degree of each key word is all 1, the number of documents is 4, and the key words having the identification number 4 or less are processed, the distance of the word vector and the average vector for the document identification number 1 is calculated.

```
W1 = (3, 2, 1, 1)
W2 = (1, 13, 2, 0)
W3 = (1, 1, 8, 0)
W4 = (0, 1, 3, 2)
Average Vector Wa =    Σ Wi/4
                 =     (5, 17, 14, 3)/4
                 =     (1.3, 4.3, 3.5, 0.8)
                       (round to one decimal)
```

A distance d1 of the word vector and the average vector of the document identification number 1 is as follows:

```
d1(D1, Wa) = 1 − W1 · Wa/|W1|*|Wa|
           = 1 − (3, 2, 1, 1) · (1.3, 4.2, 3.5,
             0.8)/3.9*38
           = 1 − 48.1/148.2
           = 1 − 0.32
           = 0.68
```

Figure 16:
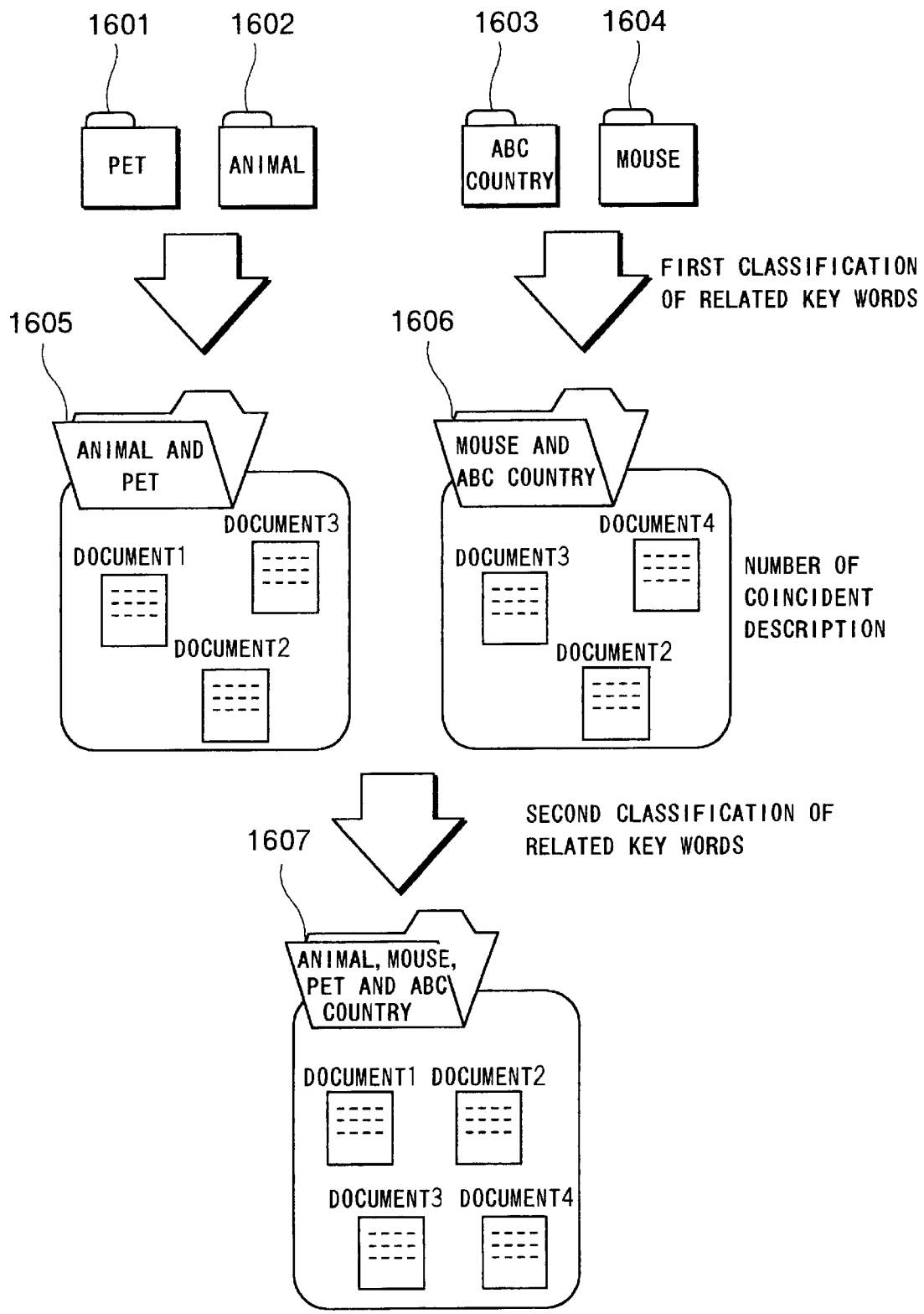
FIG. 16 shows a definite example of a related key word classified result of the first embodiment.

FIG. 16 shows a definite example of the related key word classification process. A single key word folder "pet" 1601 and a single key word folder "animal" 1602 are integrated into a related key word folder "animal and pet" 1605, and a single key word folder "ABC country" 1603 and a single key word folder "mouse" 1604 are integrated into a related key word folder "mouse and ABC country" (step 302 of FIG. 3). Further, the related key word process is repeated (step 303 of FIG. 3) to integrate the related key word folder "animal and pet" 1605 and the related key word folder "mouse and ABC country" 1606 into a related key word folder "animal, mouse, pet and ABC country" 1607. The name of the folder 1607 is described in order of "animal", "mouse", "pet" and "ABC country" to indicate that the number of documents related to the key words is larger in order of the description.

When the related key word process is completed, a first hierarchy or top class of the classification system is prepared.

The detailed classification process is now described. The detailed classification is to classify the inside of the folder hierarchically and is made by using key words which are not utilized for preparation of the higher-rank folder.

For example, the detailed classification of the inside of the related key word folder "animal, mouse, pet and ABC country" 1607 of FIG. 16 is made by using key words except the key words "animal", "mouse", "pet" and "ABC country".

Figure 17:
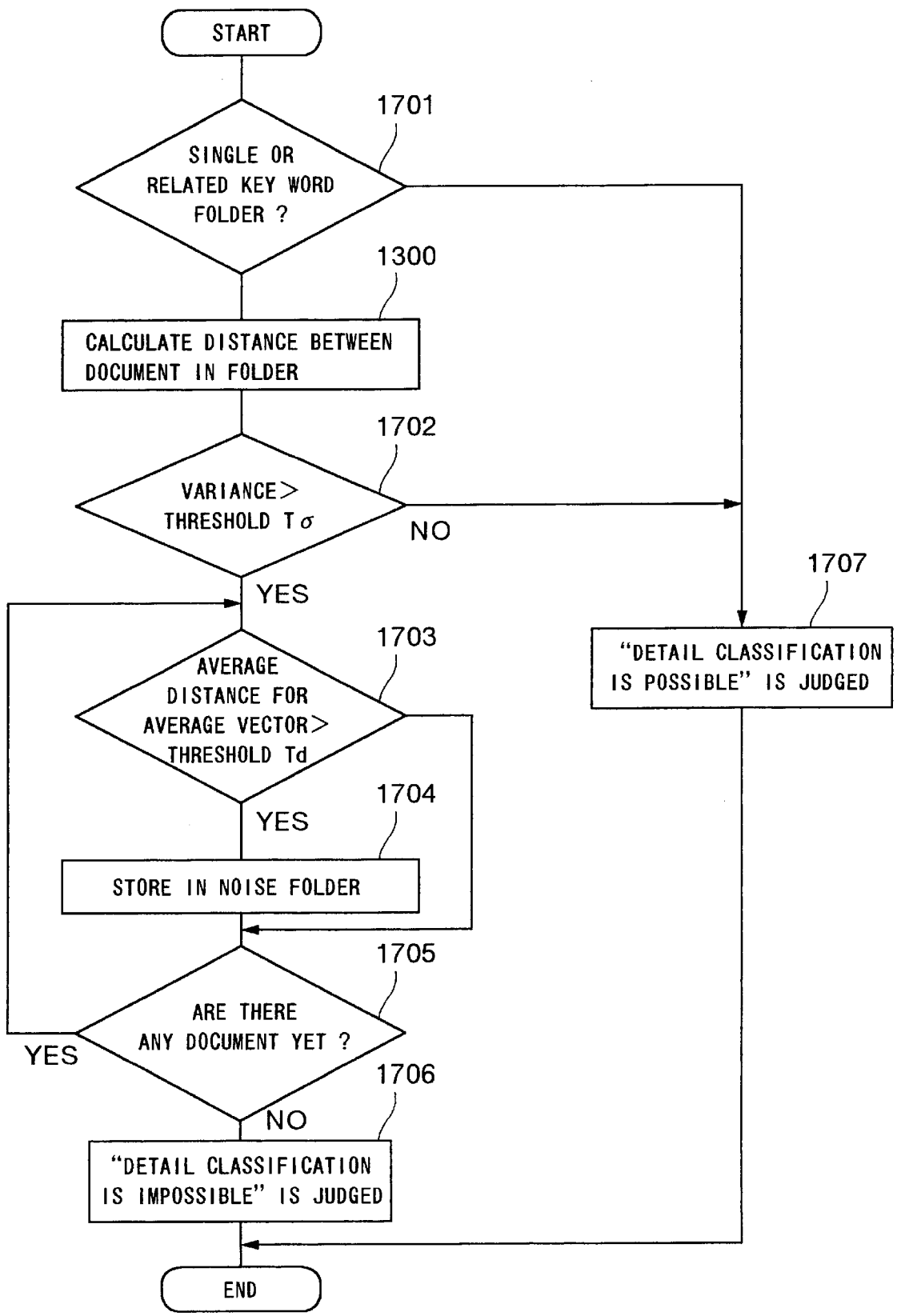
FIG. 17 is a flow chart showing a detailed classification process of the first embodiment.

Referring now to a flow chart of the detailed classification shown in FIG. 17, detail of step 304 of FIG. 3 is described. In step 1701, a type of the folder is judged.

Since the related key word folder is an integrated result of a plurality of single key word folders having high similarity, the inside of the folder is further classified hierarchically. The classification recurrently repeats the single key word process 301, the related key word classification process 302, the integration process 303 of the related key word folders and the detailed classification 304 to 306 in accordance with the flow chart of FIG. 3.

In the case of the single key word folder, since documents attracted to one key word are stored, there is no assurance as to whether the consistency as a gathering is present or not.

Accordingly, a distance between documents in the folder is calculated as indicated in FIG. 13 (step 1300) and a variance value of the distance of each document and the average vector is calculated (step 1702).

The variance value is compared with the threshold Tσ (step 1702) and when the variance value is larger than the threshold Tσ, it is regarded that there is no merit to classify the inside of the folder hierarchically and the average distance is further examined (step 1703). The document having the average distance exceeding the threshold Td is judged as a noise document having low relevance and is stored in a noise folder in the single key word (step 1704).

The noise folder is a folder for storing a document judged as noise and is prepared in only the folder in which a noise document exists. The average distances for all the documents in the folder are calculated (step 1705) and the noise document is stored in a noise document folder. Completion of classification is written in the classification completion flag 703 of the folder table 700 of FIG. 7 (step 1706).

When the dispersion is smaller than Tσ, it is judged that the inside of the single key word folder can be classified in detail and the single key word process 301, the related key word classification process 302, the integration process 303 of the related key word folder and the detailed classification 304 to 306 are recurrently repeated in accordance with the flow chart of FIG. 3.

Figure 18:
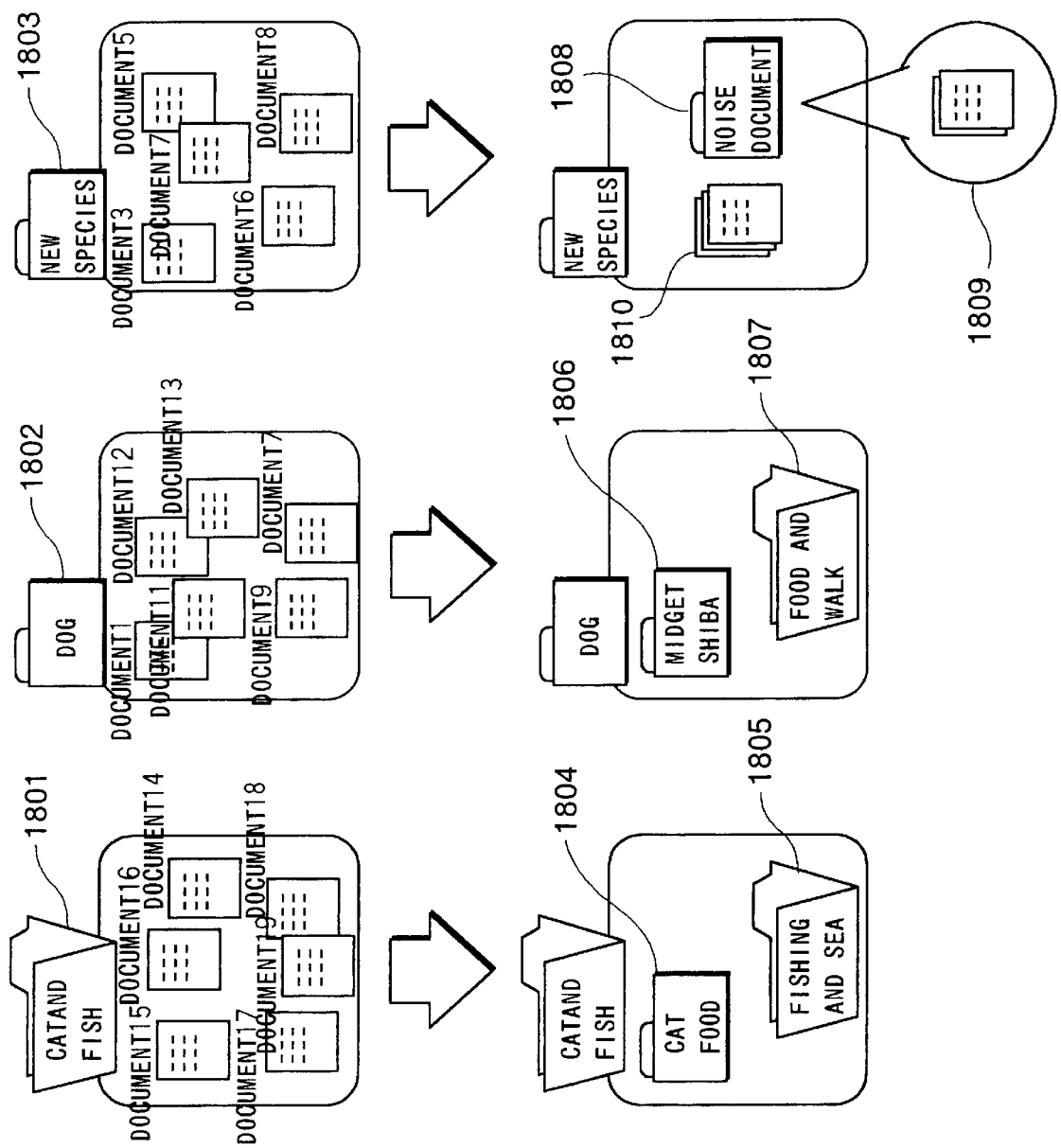
FIG. 18 shows a definite example of a detailed classified result of the first embodiment.

In a definite example of the detailed classification shown in FIG. 18, a related key word folder "cat and fish" 1801 is classified into two folders of a single key word folder "cat food" 1804 and a related key word folder "fishing and sea" 1805 hierarchically. Further, a related key word folder "dog" 1802 is classified into tow folders of a single key word folder "midget Shiba" 1806 and a related key word folder "food and walk" 1807 hierarchically. In a single key word folder "new species" 1803, a noise document 1809 is divided into a noise document folder 1808.

The detailed classification has prepared the second and subsequent hierarchies of the classification system.

The foregoing has described the flow of the document classification unit. A method of storing the hierarchical structure of the folder prepared by the classification is described with reference to a classification hierarchy management table 1900 of FIG. 19.

Each entry of the classification hierarchy management table 1900 indicates a folder information list. The folder information list 1901 includes a set of a folder name 1902, a document identification number list 1903, the number of documents 1904, a pointer 1905 to a brother folder information list, a pointer 1906 to a child folder information list, and a pointer 1907 to a parent folder information list. The folder name 1902 is coincident with the folder name 701 of the folder table 700 of FIG. 7 and the number of documents 1904 is coincident with the number of documents 702. The document identification number list 1903 is a pointer to a document identification number list 1908 stored in each folder and the document identification number list 1908 includes a set of a document identification number 1909 and a pointer 1910 to a next document identification number list. The document identification number list 1903 is coincident with the document identification number list 704 of the folder table 700 of FIG. 7. The pointer 1905 to the brother folder information list has the same higher-rank folder as the folder information list 1901 and is a pointer to the folder information list positioned in the same hierarchy. The pointer 1906 to the child folder information list is a point to one lower-rank information list of the folder information list 1901. The pointer 1907 to the parent folder information list is a pointer to the higher-rank folder information list.

Contents of the folder table 700 is copied to the classification hierarchy management table 1900 at the same time when information of the folder prepared in the folder table 700 of FIG. 7 is written.

When the folder subsequent to the second hierarchy is prepared by the detailed classification, the pointer 1906 to the child folder information list, the pointer 1905 to the brother folder information list and the pointer 1907 to the parent folder information list of the classification hierarchy management table 1900 are updated.

Figure 19:
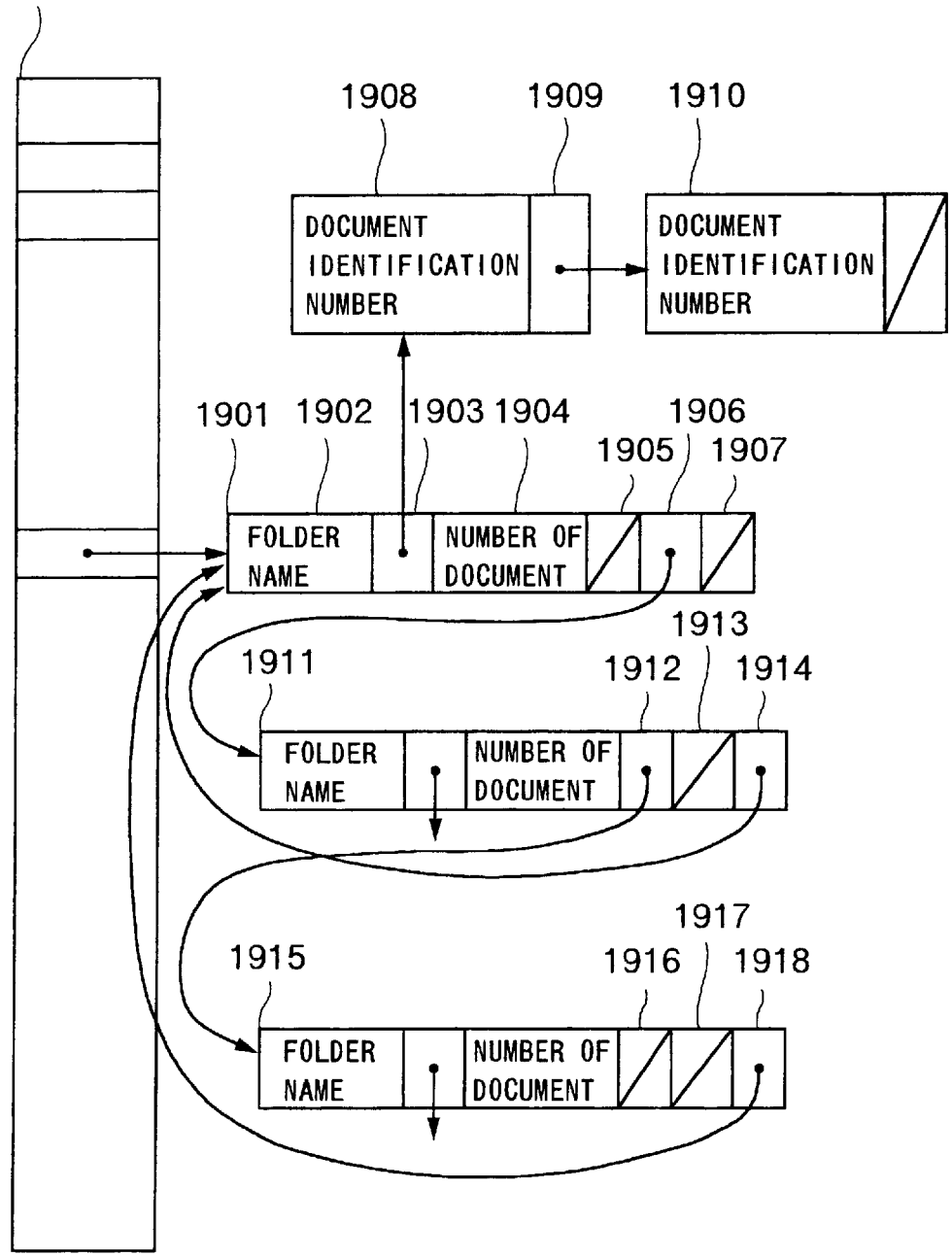
FIG. 19 shows a data structure of a classification hierarchical management table of the first embodiment.

Memory of the hierarchical structure is described concretely with reference to the classification hierarchy management table 1900 of FIG. 19. First of all, a newly prepared folder is registered in the folder information list 1901. Further, when it is assumed that the inside of the folder is classified in detail into two folders, one child folder information list 1911 is registered in the pointer 1906 to the child folder information list and a second child folder information list 1915 is registered in a pointer 1912 to the brother folder information list of 1911. Since there is no further folder, 1916 indicates that there is no connection. Since the folder information list 1901 corresponds to the parent folder information list of the child folder information list 1911 and 1915, the pointers 1914 and 1918 to the parent folder information list indicate the folder information list 1901. Since the child folder information lists 1911 and 1915 of the folder information list 1901 have no hierarchical classification subsequent thereto, 1913 and 1918 indicate that there is no connection. Since the folder information list 1901 is a folder of a first hierarchy or top class and does not include any folder positioned in a further hierarchy or the same hierarchy, 1905 and 1907 indicate that there is no connection. In addition, the folder information list 1901 has two documents and 1903 and 1909 indicate first and second document identification number lists 1908 and 1910, respectively.

Figure 20:
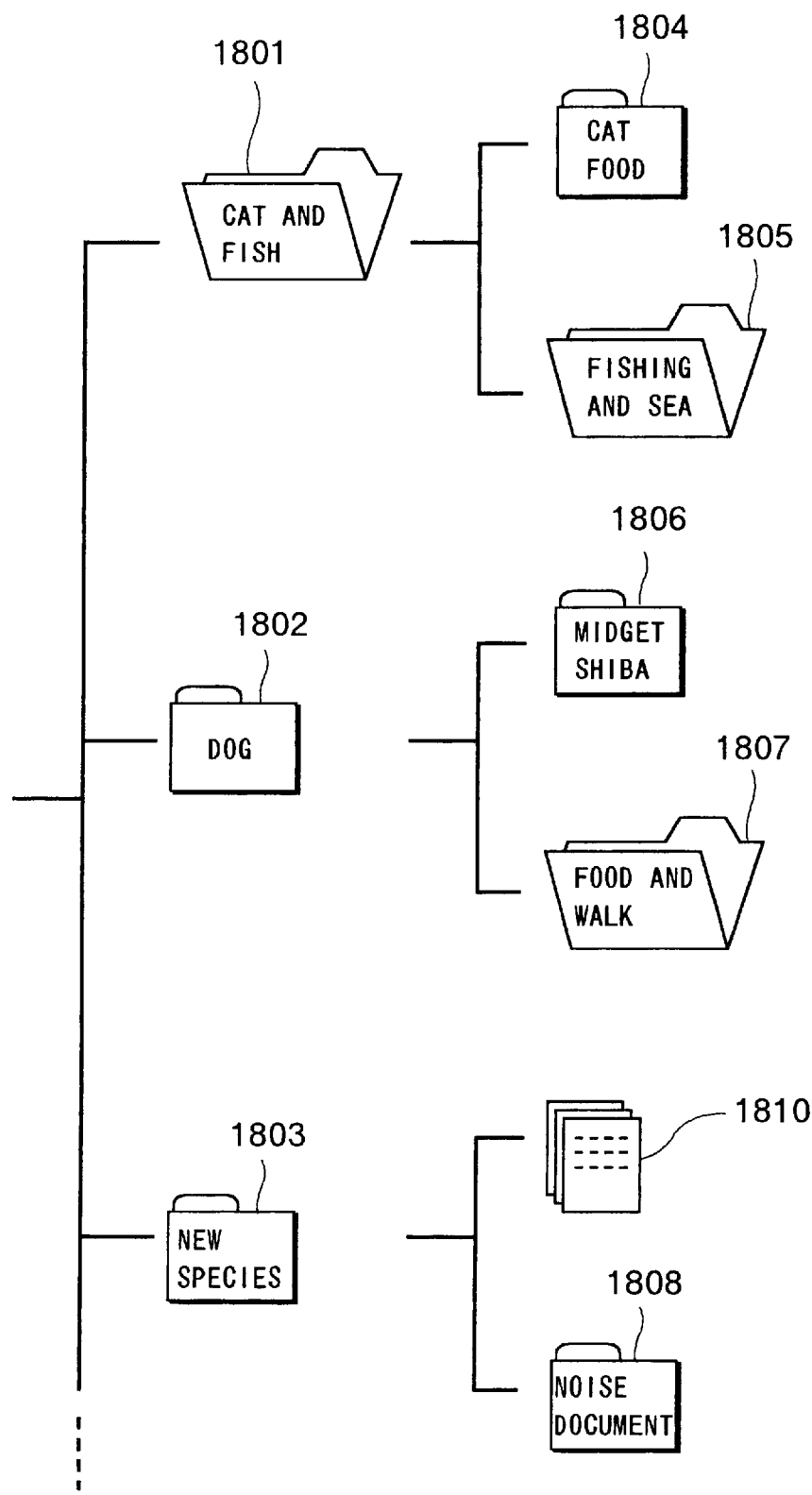
FIG. 20 shows an example of a final classified result of the first embodiment.

The classification system prepared by the document classification unit 103 of FIG. 1 is developed to a hierarchical structure as shown in FIG. 20 concretely. In the first hierarchy or top class, there are the related key word folder "cat and fish" 1801, the single key word folder "dog" 1802 and the single key word folder "new species". In the second hierarchical folder, there are the single key word folder "cat food" 1804 and the related key word folder "fishing and sea" 1805 in a lower-rank of the folder 1801 and there are the single key word folder "midget Shiba" 1806 and the related key word folder "food and walk" 1807 in a lower rank of the folder 1802. Noise document is separated into the noise document folder in a lower rank of 1803.

Figure 21:
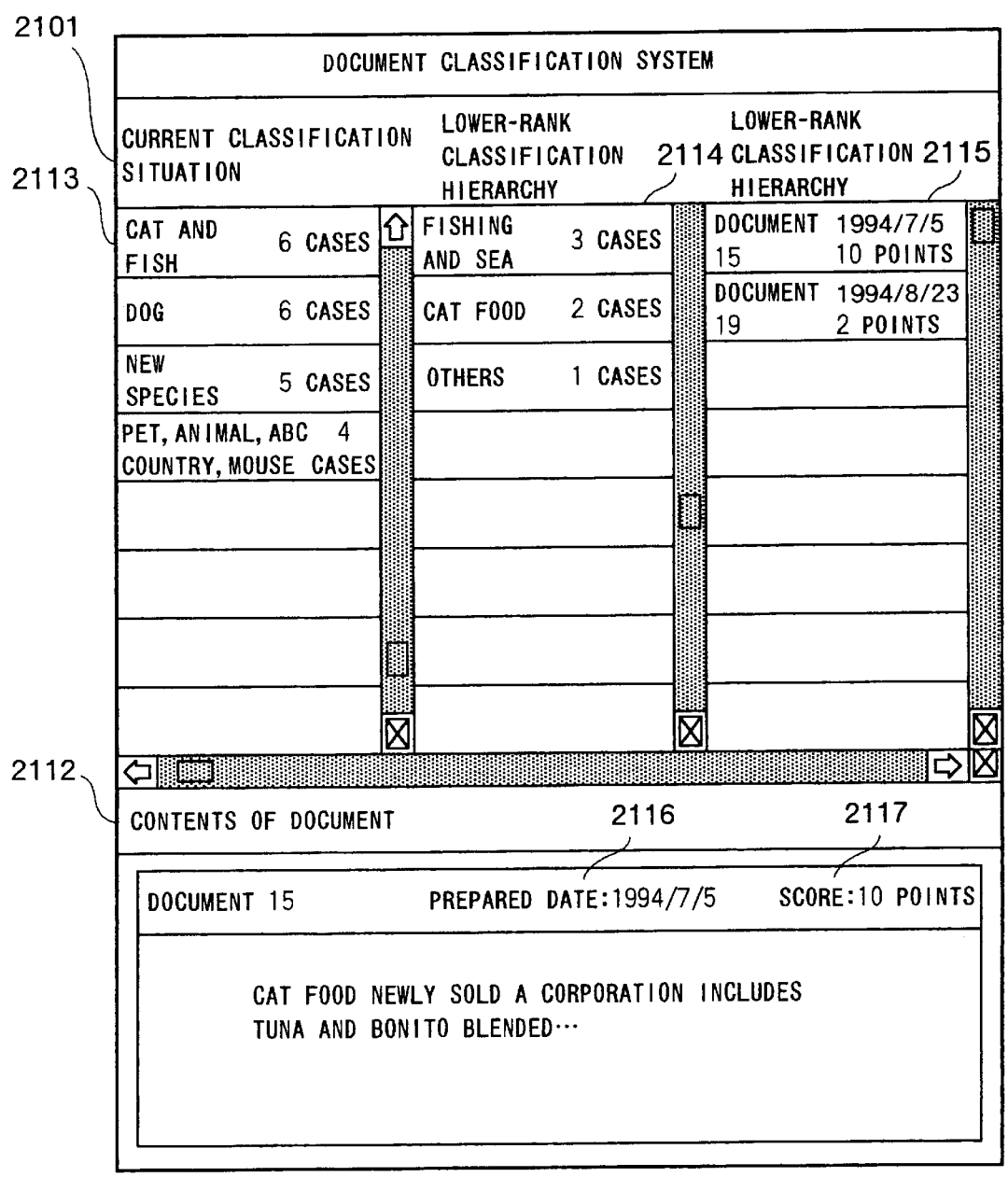
FIG. 21 shows a definite example of a displayed picture of a classified result of the first embodiment.

When the classified result output unit 104 of FIG. 1 receives the above classification system from the document classification unit 103, the classified result output unit prepares an interface screen as shown in FIG. 21 and outputs it to the CRT 109. Three higher-rank hierarchies of the classification system are displayed in 2101 of FIG. 21, and 2113, 2114 and 2115 indicate the first hierarchy or top class, the second hierarchy and the third hierarchy, respectively. In FIG. 21, as a result of selecting the first hierarchy or top class "cat and fish" and selecting the second hierarchy "cat food", the document group is displayed in the third hierarchy and a document 15 is selected. 2112 indicates contents of the document 15, a prepared date 2116 of the document and the score information 2117 of the document 15 in the folder. The user can select an interesting folder name by means of the mouse 111 of FIG. 1 and refer to contents thereof freely. Further, the user can skip uninteresting folders to reduce an amount of documents to refer to.

When arrival of a new document or deletion of an old document is made for the document data base 107 of FIG. 1, the document classification unit 103 can perform re-classification to cope with reception of new information.

According to the first embodiment, the following effects are obtained.

(1) Documents can be classified without dependence on the existing classification system.
(2) The hierarchical classification system can be prepared automatically.
(3) The representative name of the classified group can be given. The representative name is given in order of the higher relevance to the classified group.

As a result, even if the user do not specify an interesting object particularly, a desired document can be detected from a large number of documents. Alternatively, when an interesting field is determined but a key word representative of the field is not considered, the embodiment can assist to find out the key word.

A second embodiment is now described. The second embodiment concerns the document classification apparatus including classification designation means for constructing the classified result to which the user's opinion is reflected and provided in the classified result output unit 104 of the document classification apparatus 100 of the first embodiment shown in FIG. 1.

The document classification apparatus of the first embodiment sometimes produces the classified result different from the user's intention or idea since the document is classified automatically without restraint of the existing classification system. Accordingly, as shown in FIG. 22, a classification designation unit 2201 constituting means for reflecting the user's opinion to the classified result is added to the classified result output unit 104 of FIG. 1 to constitute a document classification apparatus 2200. The classification designation unit 2201 includes two picture screens of a folder number designation interface 2500 and a classification system construction assisting interface 2700.

Figure 23:
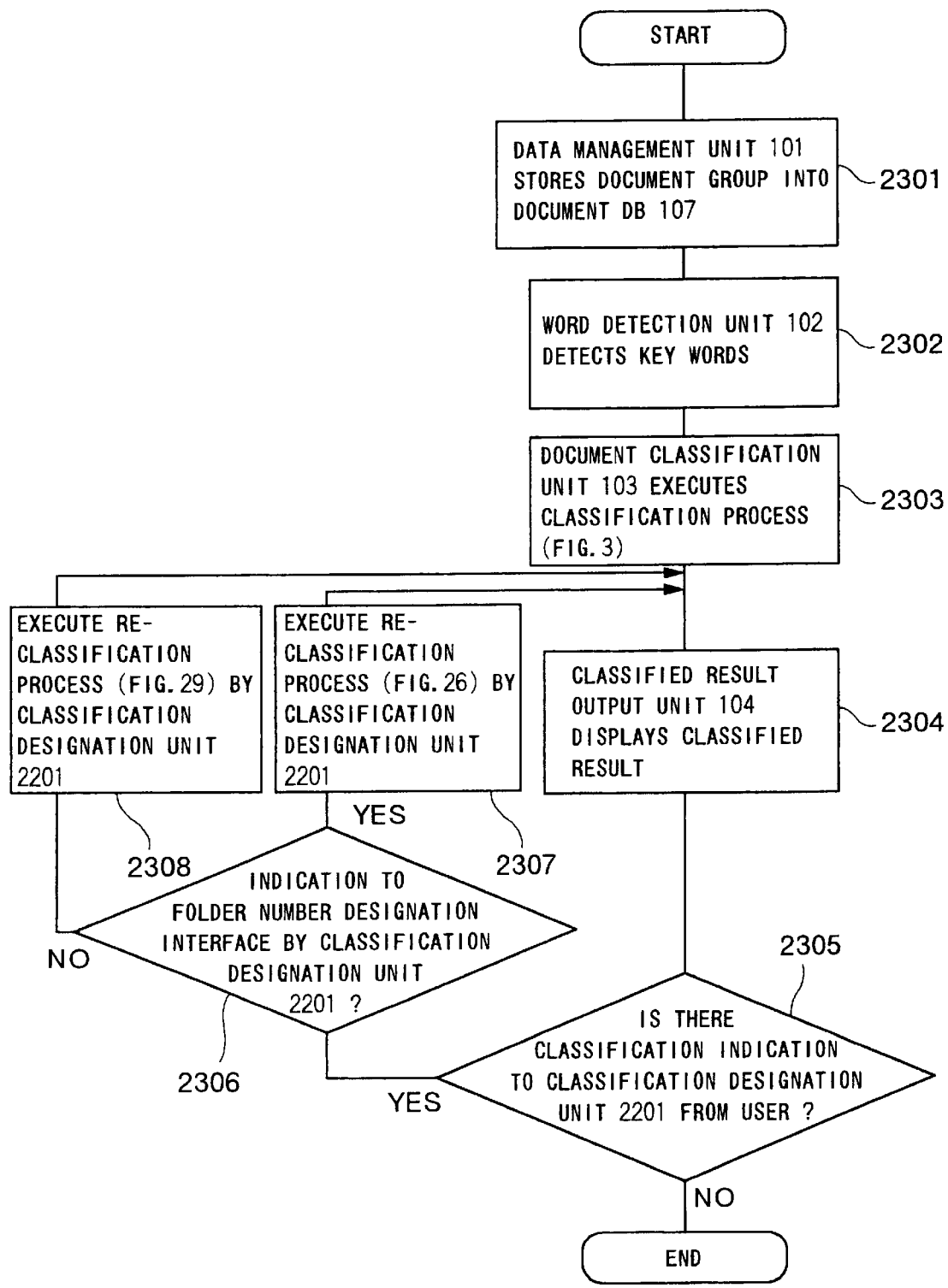
FIG. 23 is a flow chart of a document classification apparatus of the second embodiment.

When the user specifies a document group desired to be classified by using the input device such as the key board 110 or the mouse 111 and directs to execute the classification process, the document classification apparatus 2200 is started to perform the process based on a flow chart of FIG. 23. First, in step 2301, the data management unit 101 stores the document group specified by the user into the document data base 107.

In subsequent step 2302, the word detection unit 102 detects key words from the document group and stores the key words into the word dictionary 105. When data for performing the classification process can be prepared, the document classification unit 103 creates the classification system in accordance with the flow chart of FIG. 3 in step 2303 and classifies the documents. The classified result output unit 104 displays the classified result in the interface picture as shown in FIG. 21 to present it to the user (step 2304). The processing steps described so far are the same as those of the first embodiment. Further, it is confirmed whether there is an indication to the classification designation unit 2201 from the user referring to the classified result or not (step 2305) and when there is no indication, the process is terminated. When there is an indication, contents of the indication are interpreted in step 2306, so that when it is the indication to the folder number designation interface 2500, a re-classification process of step 2307 is performed and when it is the indication to the classification system construct assisting interface 2700, a re-classification process of step 2308 is performed. The folder number designation interface 2500 and the classification system construct assisting interface 2700 are described later in detail. The process is returned to step 2304 and the re-classified result is presented to the user. The case where the user issues an indication to the classification designation unit 2201 includes a case where the classified result does not satisfy the user's intention or idea.

The two input pictures of the folder number designation interface 2500 and the classification system construction assisting interface 2700 offered by the classification designation unit 2201 are now described. Indication information relative to the re-classification taken in from the interfaces and the re-classification processes 2307 and 2308 are described in detail.

First of all, the folder number designation interface 2500 is described.

Figure 24:
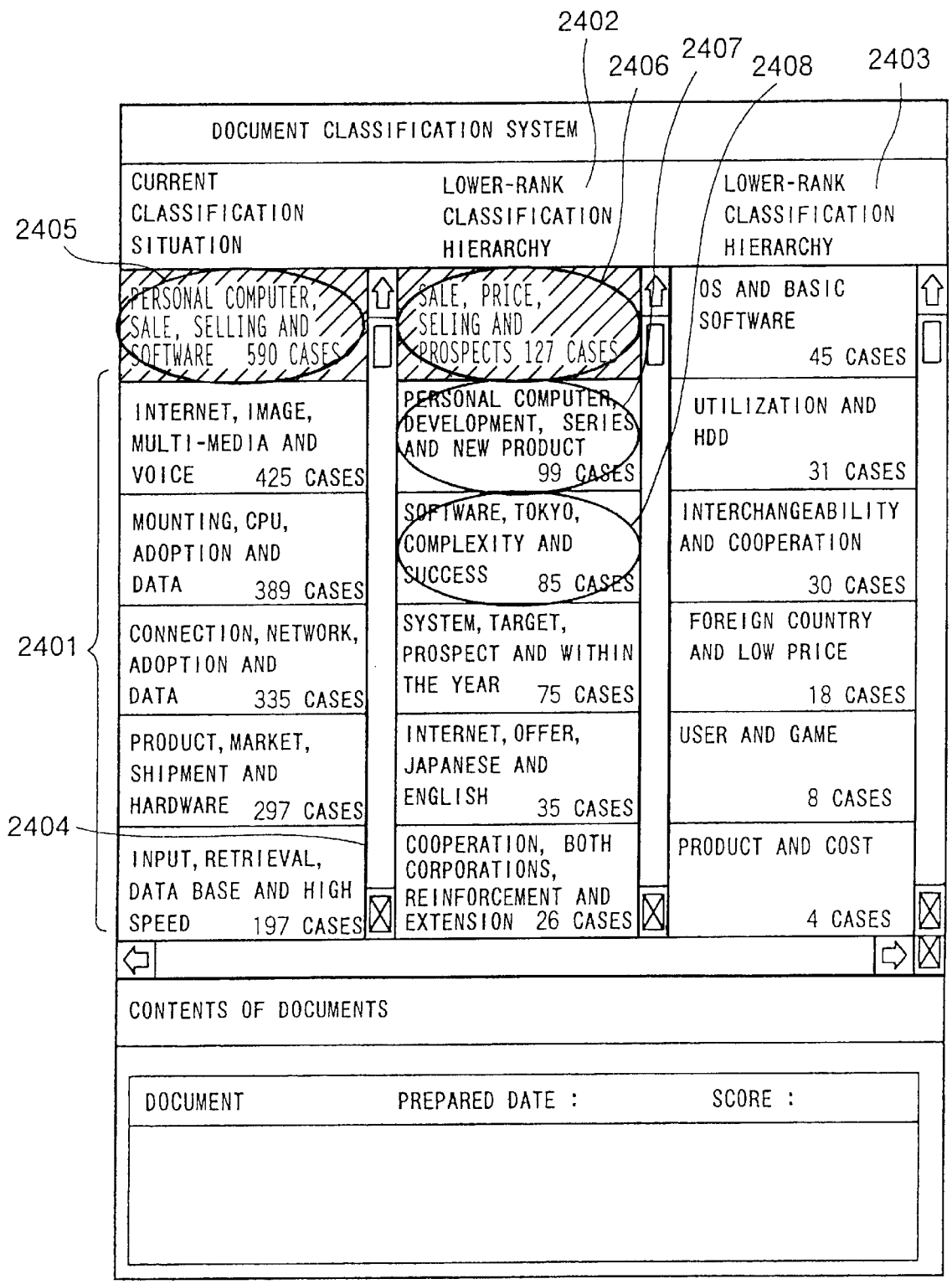
FIG. 24 shows a definite example of a displayed picture of a classified result produced by a classified result output unit of the second embodiment.

FIG. 24 shows an interface picture indicating a classified result of a document group relative to computers of one thousand cases and prepared by the classified result output unit 104. This interface picture is the same kind of output picture as FIG. 21 and the classified result prepared by the document classification unit 103 is read out and prepared in the same manner as the first embodiment. Concretely, information displayed in the picture of FIG. 14 is obtained by reading out the folder name 1902, the document group 1903, the number of documents 1904 and the hierarchical relation (1905, 1906 and 1907) of the folder from the classification hierarchy management table 1900 of FIG. 19.

In this manner, when contents of the document group are spread variously even in the case of the document group in one field, the document group can be classified in detail and several tens to several hundreds of folders are produced. FIG. 24 shows the three higher-rank hierarchies of the classification system by taking the case where several tens of folders are produced in the first hierarchy or top class as a result of classification and the equal number of folders are produced in the lower rank of each folder as an example. A folder "personal computer, sale, selling and software" 2405 and a folder "sale, price, selling and prospects" 2406 are shown with the state thereof being reversed to indicate that the folders are selected in order that the user refers to the folders. 2401 indicates vertically listed names of a plurality of folders produced in the first hierarchy or top class, 2402 indicates names of folders in the lower-rank (second) hierarchy of the user selected folder "personal computer, sale, selling and software" 2405 in the first hierarchy 2401, and 2403 indicates vertically listed names of folders in the lower-rank (third) hierarchy of the user selected folder "sale, price, selling and prospects" 2406 of the second hierarchy 2402. In FIG. 24, only six folder names are shown in the first hierarchy, while the picture can be scrolled by means of a scroll bar 2404 to refer to several folder names actually.

With respect to the detailed classification process (FIG. 17) for further subdividing the inside of the first hierarchy to prepare the second and subsequent hierarchies, the case where the classification is made by using the key words which are not utilized to prepare the higher-rank folder has been supposed in the first embodiment, while in this example the case where the classification is made by using the key words utilized to prepare the higher-rank folder as well as the key words not utilized is described. Accordingly, the key words utilized to prepare the folders of the higher-rank hierarchy sometimes appear in the folders of the lower-rank hierarchy. For example, the key words "personal computer", "sale", "selling" and "software" contained in the folder "personal computer, sale, selling and software" 2405 of the first hierarchy are contained in the folder "sale, price, selling and prospects" 2406, the folder "personal computer, development, series and new product" 2407 and the folder "software, Tokyo, complexity and success" 2408 of the second hierarchy 2402.

The number of folders of the first hierarchy is increased in the classified result and it is difficult to find out a desired folder. On the other hand, when the number of folders in one hierarchy is reduced and the hierarchy is deepened so that the detailed classification is made, it takes time to find out a desired document. The number and the size of a folder proper as the classified result are different depending on the number of documents to be classified and the homogeneity of contents of the document. Since whether the classified result is proper or not is different in accordance with the viewpoint of the user who refers to the classified result, it is difficult to previously set the proper number of folders and the proper average number of documents. Accordingly, the folder number designation interface 2500 serves to provide environment in which the number and the size of folders of the classified result produced by the document classification unit 103 can be designated by the user.

In the folder number designation interface 2500 shown in FIG. 25, information relative to the classified result such as the number of folders and the average number of documents in the folder is presented to the user to receive an indication for integrating the number of folders and the average number of documents suitable in accordance with the user's desire again. Generally, the number of folders and the average number of documents have the relation that both are interlocked with each other so that when the number of folders is reduced the average number of documents is increased, the user is adapted to be able to use either of the two as a reference for estimating the classified result. 2501 represents the number of folders produced in one hierarchy and 2502 represents the average number of documents. A folder number adjusting bar 2503 and an average document number adjusting bar 2504 are graphical user interfaces (GUI) for enabling the user to specify increase or reduction of the number of folders and the average number of documents. 2505 represents the situation of the whole classification system by supposing that circles each having a diameter expressed in accordance with the number of documents are the folders. In order to prepare the folder number designation interface, the classification designation unit 2201 reads out information relative to the first hierarchy 2401 from the classified result output unit 104 and examines the number of folders and the number of documents in each folder to write the number of folders into 2501 and the average number of documents into 2502, so that the picture 2505 in which the folders are displayed by circles each having a radius proportional to the number of documents is prepared.

FIG. 25 shows a state that the folder number adjusting bar 2503 is operated by the user to indicate reduction of the number of folders. When the re-classification process 2307 is executed in response to the user's indication, a new classified result is produced and the folder number designation interface is changed from 2500 to 2510. Detail of the re-classification process 2307 is described later.

The number of folders 2501 is 96 before the re-classification, while the number of folders 2511 is reduced to 30 by reflecting the user's indication. In this manner, the user can adjust the classified result to a level that the user can easily refer to the number of folders.

Figure 26:
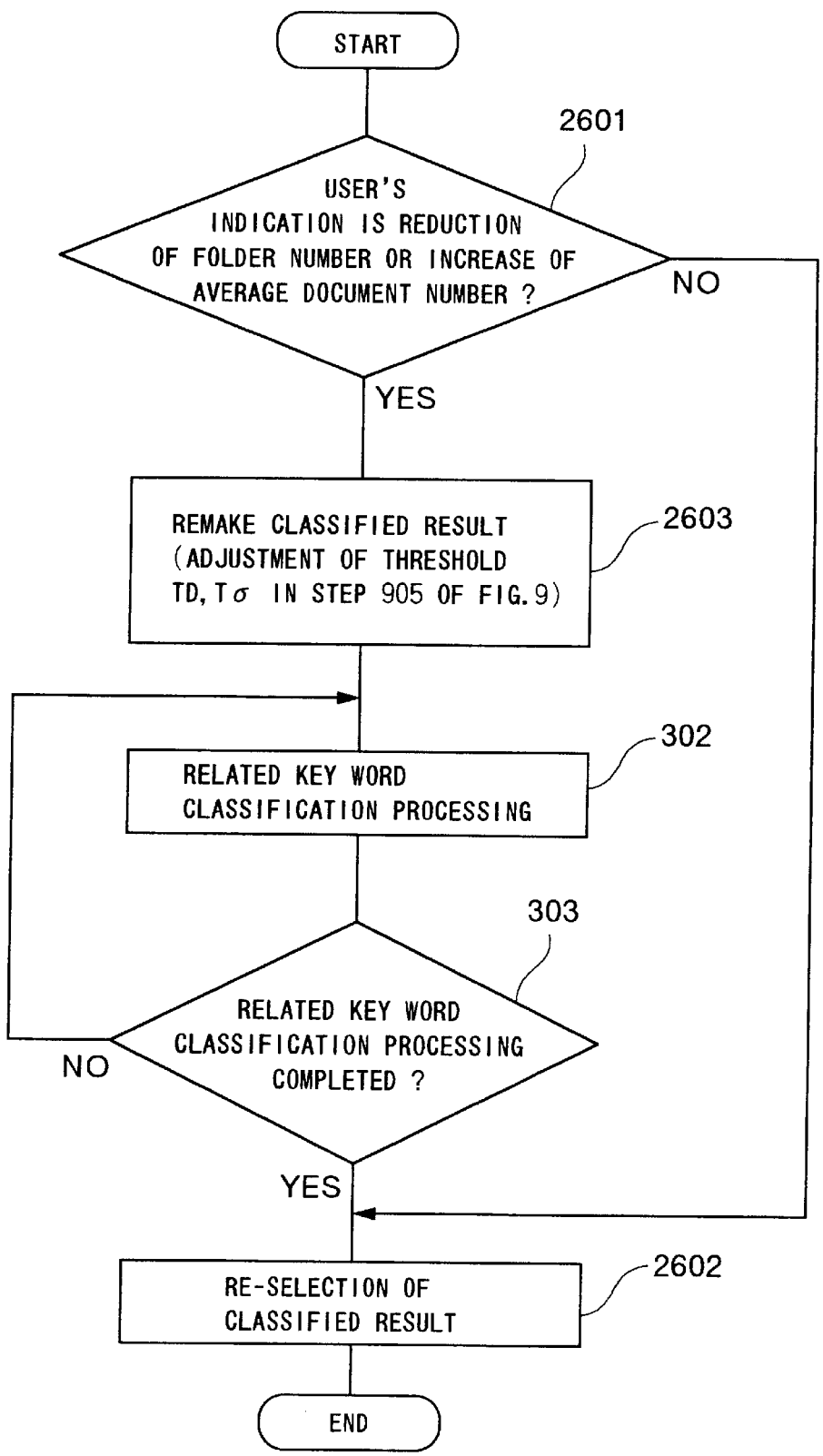
FIG. 26 is a flow chart showing a reclassification process performed on the basis of auxiliary information received from the folder number designation interface of the second embodiment.

Referring now to FIG. 26, the re-classification process 2307 performed by the classification designation unit 2201 on the basis of the user's indication taken in from the folder number designation interface 2500 is described.

First of all, the classification designation unit 2201 analyzes the contents of the indication from the user in step 2601. When the indication is not to indicate "reduction of the number of folders" or "increase of the average number of documents", the classified result in the classification process 2303 is reviewed in step 2602 and the classification designation unit 2201 instructs the document classification unit 103 to re-select the classified result having the increased number of folders and the reduced average number of documents.

The re-selection process 2602 of the classified result performed by the document classification unit 103 is described. In the classification process 2303 performed by the document classification unit 103, the related key word process 302 is repeatedly applied on the basis of the flow chart of FIG. 3 to produce folders constituting the classified result and documents are classified into these folders. The related key word process 302 is to integrate probably related sets of folders in accordance with the flow chart shown in FIG. 9 to thereby produce the folders constituting the classified result. The folder table 700 (FIG. 7) for recording information relative to the folder is updated each time the related key word classification process 302 is repeated and information at the time that the related key word process 302 is completed (step 303) is adopted as the folder constituting the classified result.

More particularly, each time the related key word classification process 302 is repeated, the folders are integrated to reduce the number of folders and increase the average number of documents as a whole of the classified result. Accordingly, by recording information of the folder table 700 as intermediate folders for each of the related key word classification process 302, the folder having the increased number of folders and the reduced average number of documents as compared with the classified result can be re-selected later. For example, when it is assumed that the folder "animal, mouse, pet and ABC country" 1607 of FIG. 16 of the first embodiment is one of the folders constituting the classified result, the intermediate result includes the folder "animal and pet" 1605 and the folder "mouse and ABC country" 1606. Since there are the intermediate results corresponding to the number of times of repetition of the related key word process 302, the intermediate result having "the smaller number of folders" and "the larger average number of documents" is selected in accordance with the increased and reduced level of the adjusting bar indicated by the user to thereby cope with the user's indication.

On the other hand, in step 2601, when the user indicates "reduction of the number of folders" and "increase of the average number of documents", the classification designation unit 2201 instructs the document classification unit 103 to "remake the classified result having the smaller number of folders and the larger average number of documents" (step 2603). The document classification unit 103 responds to this instruction to further integrate the folders of the classified result to thereby make "the classified result having the smaller number of folders and the larger average number of documents". The case where the folders constituting the classified result are produced in the classification process 2303 is the case where it is judged in step 303 of the flow chart of FIG. 3 that the related key word classification process is completed, that is, the case where it is judged in step 905 of FIG. 9 that the folders cannot be integrated any longer. Thus, in step 2603, the threshold values Td and Tσ constituting the integration judgment condition of step 905 are adjusted to set so that the folders can be integrated further. As described in conjunction with FIG. 17 of the first embodiment, the threshold Td is an index for judging that the integration is not proper when a distance from the average vector is separated over Td and accordingly, the threshold Td is reestablished to a larger value. The threshold Tσ is an index for judging that the integration is not proper when a variance value of a distance from the average vector is larger than Tσ and accordingly the threshold Tσ is reestablished to a large value. A definite value is determined by the document classification unit 103 in accordance with the increase and reduction level of the adjusting bar indicated by the user. After these preparations, the related key word process 302 is applied to further integrate the folders repeatedly as much as possible (step 303). Consequently, since the classified result having the reduced number of folders and the increased average number of documents as compared with the classified result previously presented to the user can be prepared, the re-selection process 2602 of the classified result is performed from this result.

The classification system construction assisting interface 2700 which is another input picture presented by the classification designation unit 2201 is now described in detail.

The document classification unit 103 sometimes prepares the hierarchical relation which is inconsistent with the concept of general higher-rank words and lower-rank words since the document classification unit 103 hierarchizes the folders automatically without use of information such as the thesaurus. For example, the folder "dog" 1802 and the folder "midget Shiba" 1806 of FIG. 20 have the correct upper and lower relation, while if they are reversed, the reversed relation is inconsistent conceptually.

As a solving approach, there is considered a method of inhibiting preparation of folders having the relation improper as higher-rank words and lower-rank words by using the thesaurus 106. However, the folder names prepared by the document classification apparatus of the present invention often have the integrated form of key words such as the folder "cat and fish" 1801. Accordingly, only investigation of the higher and lower relation of one-to-one in key words such as "dog" and "midget Shiba" in the above example cannot cope with the above-mentioned conceptual inconsistency and it is necessary to consider the higher and lower relation of plural-to-plural in key words. At this time, if the higher-rank folder "A and B" and the lower-rank folder "C and D" are prepared from key words A, B, C and D, for example, there remains a problem that it cannot be judged whether the case where "the key words A and C are proper as the higher-rank word and the lower-rank word but the key words B and D have the reversed relation" is proper or not and accordingly this method is unsatisfactory.

The classification system construction assisting interface 2700 receives auxiliary information for preparing a proper hierarchical structure from the user and allows the document classification unit 103 to perform the classification process by using the auxiliary information. For example, in the specification of a patent, particular items such as "Title of the Invention" and "Claims" and contents to be described in each item are defined and these information corresponds to the auxiliary information. The contents of description in each item are different in each specification, while it is considered that there are common points in the degree of the specialty and generality and the degree is determined for each item. For example, since the precondition and the background of an invention are described in the items such as "Title of the Invention" and "Field of the Invention" of a specification, these items have the higher generality as compared with other items. Further, contents of an invention are described in items such as "Summary of the Invention" and "Description of the Preferred Embodiments" and accordingly these items have the higher specialty. Higher-rank key words have the higher generality, and the lower-rank key words have the higher specialty as the lower-rank key words are positioned in the lower rank.

Accordingly, key words appearing in items of contents having the higher generality are utilized to prepare folders of the higher-rank hierarchy and key words appearing in items of contents having the higher specialty are utilized to prepare folders of the lower-rank hierarchy to thereby be apt to construct the proper hierarchical structure. Items utilized in the classification are limited for each hierarchy so that key words appearing in the items such as "Title of the Invention" and "Field of the Invention" having the higher generality are utilized to prepare the higher-rank hierarchy and key words appearing in the items such as "Summary of the Invention" and "Description of the Preferred Embodiments" are utilized to prepare the lower-rank hierarchy. The classification system construction assisting interface 2700 can easily receive the items included in the document and the specialty of the description in the items from the user.

Figure 27:
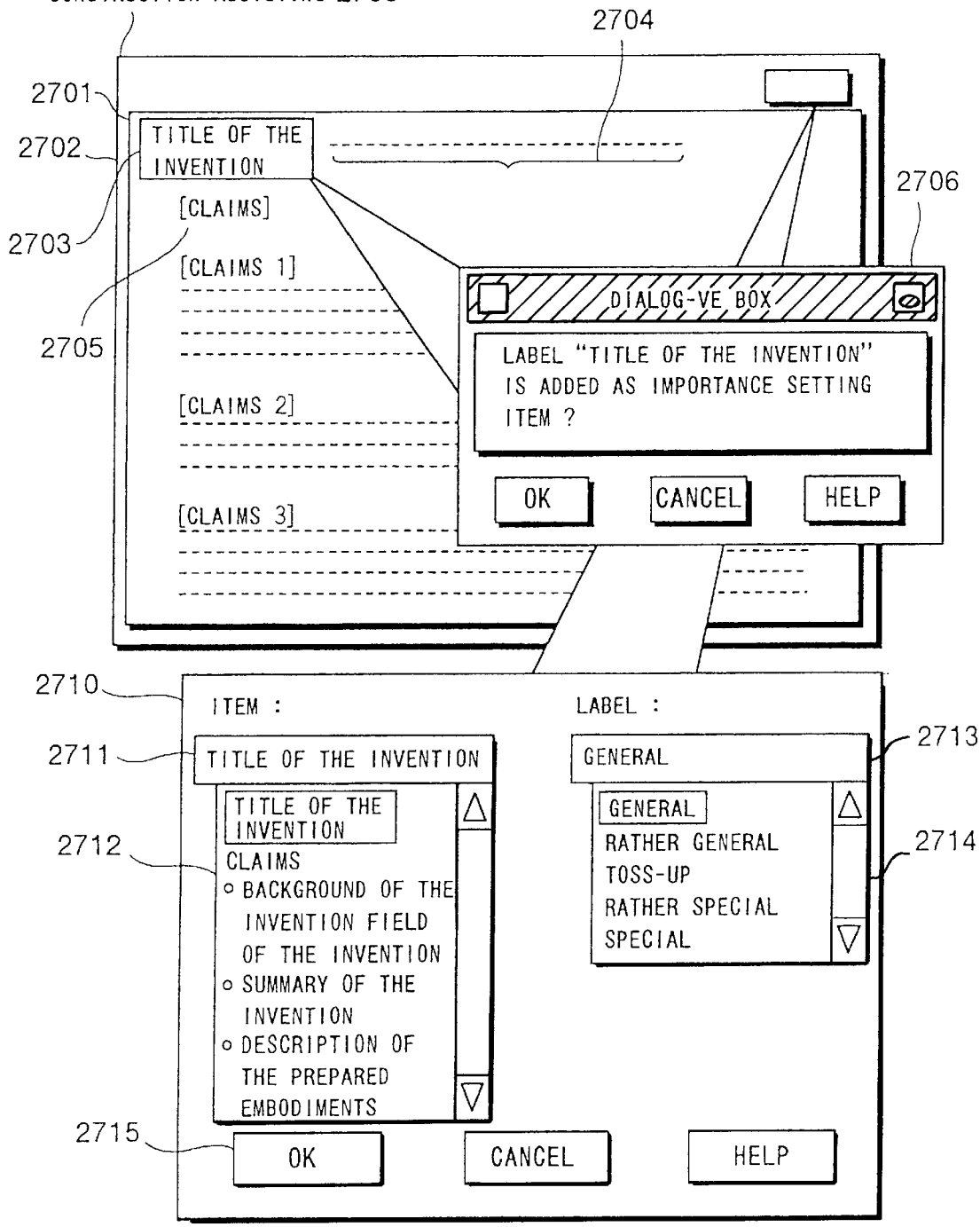
FIG. 27 shows a definite example of a classification system construction assisting interface and a picture for setting items of the second embodiment.
Figure 28:
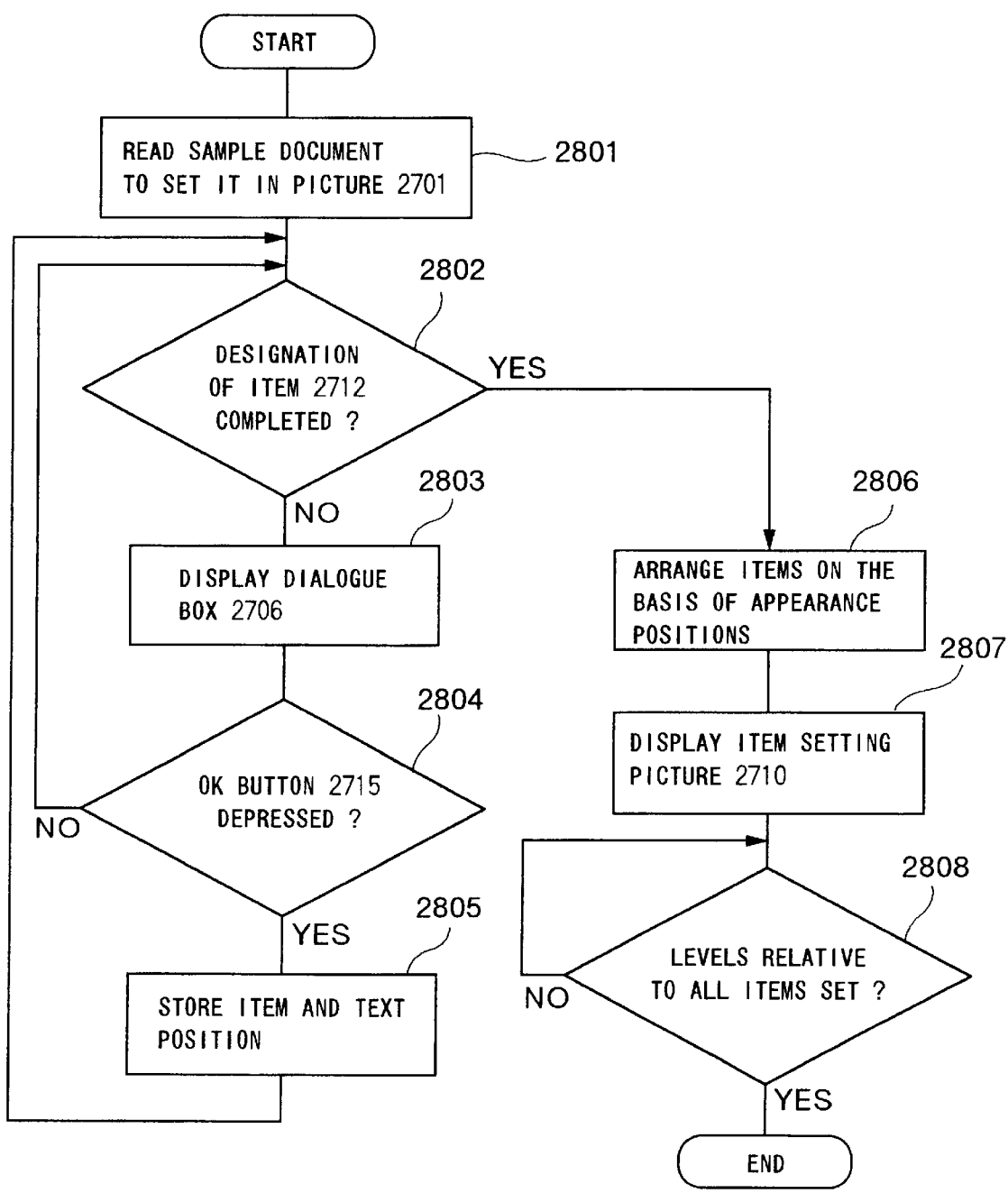
FIG. 28 is a flow chart showing a process for receiving auxiliary information from a user through the classification system construction assisting interface of the second embodiment.

FIG. 27 shows an displayed example of the classification system construction assisting interface 2700 in the case where the document classification apparatus 2200 classifies a specification of a patent. The process of receiving the auxiliary information from the user through the classification system construction assisting interface 2700 by the classification designation unit 2201 is now described with reference to a flow chart of FIG. 28. In step 2801, the classification designation unit 2201 reads out a sample document to set it to a picture 2701. The sample document is one of documents stored in the document data base 107 and is a specification of a patent in FIG. 27 by way of example. In next step 2802, information relative to items in the sample document is received from the user. The user can specify a string of characters on the picture 2701 by means of the mouse 2702. In FIG. 27, the character string of the item "Title of the Invention" is dragged by means of the mouse 2702 to be specified as an item. In this manner, when the item is specified by the user, a dialogue box 2706 is displayed in step 2803 to require the user to confirm whether the item specified by the user is proper or not. When the confirmation is made by the user in step 2804, information relative to the item and an appearance position of the item on the sample document is taken in (step 2805). In other words, the classification designation unit 2201 stores the item of "Title of the Invention" and the information of the appearance position of "the first to the fifth locations of characters". When reception of all the items in the sample document is completed, the items are arranged in order of appearance thereof in the sample document on the basis of the appearance positions of the items in step 2806 and the arranged items are displayed in 2712 of an item setting picture 2710 (step 2807). In next step 2808, information relative to the degree of the specialty of all the items is received from the user. The classification designation unit 2201 displays the previously prepared degrees of several kinds indicative to the specialty in a level list 2714. Accordingly, the user selects one of the items from 2712 by using the displayed level list 2714 and selects one proper level from the level list 2714 in consideration of the generality and the specialty of the contents thereof. Then, the selection is settled by means of an OK button 2715. The designation is performed by such a procedure. The item setting picture 2710 provides the five kinds of degrees of the specialty relative to the items such as "general", "rather general", "toss-up", "rather special" and "special" and accordingly the degree suitable for each item is selected therefrom. The degree of the specialty relative to the items is referred to as an item level, which will be described in detail later.

Figure 29:
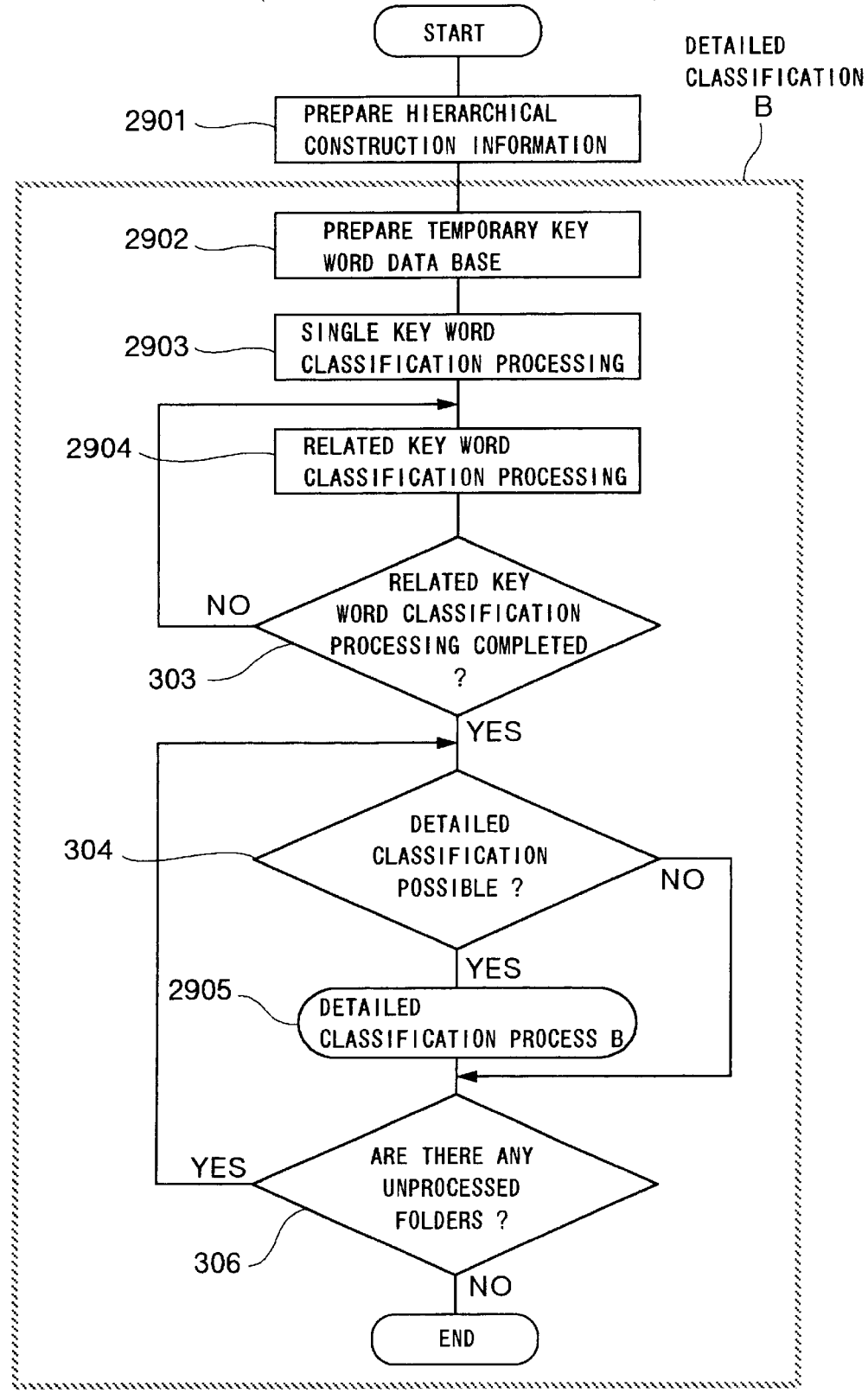
FIG. 29 is a flow chart showing a reclassification process performed on the basis of auxiliary information received from the classification system construction assisting interface of the second embodiment.

Referring now to FIG. 29, the re-classification process 2308 performed by the classification designation unit 2201 on the basis of the user's instruction taken in from the classification system construction assisting interface 2700 is described in detail. In step 2901, the classification designation unit 2201 prepares hierarchical construction information on the basis of the item and the item level taken in from the user. The hierarchical construction information is information which the classification process 2303 refers to in order that the document classification unit 103 constructs the classified result of a proper hierarchical structure and is to prescribe the items and the importance of the items to be utilized in the classification when a certain hierarchy is constructed. Detail thereof is described later.

In next step 2902, the hierarchical construction information is used to prepare a temporary key word data base. The temporary key word data base is to store a set of key words to which the importance is given as the key word utilized in the classification when a certain hierarchy is constructed and has the same format as the key word data base of the first embodiment. Preparation of the temporary key word is described later. The above process is a processing step for preparing data for constructing the classified result of a proper hierarchical structure on the basis of the information taken in by the classification designation unit 2201 from the user.

The classification designation unit 2201 instructs the document classification unit 103 to construct the classified result of the proper hierarchical structure by using the above data. In step 2903, the document classification unit 103 uses the temporary key word data base in place of the key word data base of the first embodiment to perform the single key word process 301 for clustering documents having key words included in the key word group for each key word.

In step 2904, the related key word process 302 for integrating sets of single key word folders including similar document groups is performed in regard to single key word folders prepared by the single key word classification process 2903. In the second embodiment, in order to construct the classified result of the proper hierarchical structure in the process for judging whether the integration is to be made or not in step 1402 of FIG. 14 described in the first embodiment, the hierarchical construction information is used to give the importance to each key word of the word vector. Detail thereof is described later.

In next step 303, in the same manner as the first embodiment, the integration of the related key word folders including similar document groups is repeated for the related key word folders prepared by the related key word process. Further, whether the prepared single key word folder and related key word folder can be classified in detail or not is examined (in the same manner as in step 304 of the first embodiment) and when the detailed classification is possible, the inside of the folder is classified (step 2905). In step 2905, the process B from step 2902 to the end of FIG. 29 is applied to the documents classified in the folder. In step 306, the hierarchical classification is repeated for the inside of all the folders.

Detail and function of the hierarchical construction information are now described. In this description, the document classification apparatus 2200 is assumed to prepare the classification system of three hierarchies and five kinds of item levels including "general", "rather general", "toss-up", "rather special" and "special" can be set. Four items of FIG. 30 and the item levels are given by the user through the classification system construction assisting interface 2700 in accordance with the flow chart of FIG. 28. As rules for preparing the hierarchical construction information, the following are supposed, for example.

○ First hierarchical construction rule:
    Importance of item level "general" = a
    Importance of item level "rather general" = b
    Importance of other item levels = 0
○ Second hierarchical construction rule:
    Importance of item level "rather general" = c
    Importance of item level "toss-up" = d
    Importance of item level "rather special" = e
    Importance of other item levels = 0
○ Third hierarchical construction rule:
    Importance of item level "rather special" = f
    Importance of item level "special" = g
    Importance of other item level = 0

For example, in the first hierarchical construction rule, when a folder in the first hierarchy or top class is prepared, the importance degree of the item level "general" is defined to a, the importance level of the item level "rather general" is defined to b, and the importance degree of other item levels is defined to 0, in other words, this means that other item levels are not utilized in classification. For example, when it is considered that the first hierarchy or top class is desirably classified on the basis of general contents, fixed numbers which are not less than 0 and not exceeding 1 are experientially determined to the importance degrees a to g and are set in the classification designation unit 2201 so that the importance degree of the item level "general" is defined to 1, the importance degree b of the item level "rather general" is defined to 0.5 and the importance level of other item level is defined to 0.

The hierarchical construction information for the item level of FIG. 30 is prepared on the basis of the above rules as follows:

○ First hierarchical construction information:
    (a, 0, 0, b)
○ Second hierarchical construction information:
    (0, e, 0, c)
○ Third hierarchidal construction information:
    (0, f, g, 0)

The first, the second, the third and the fourth elements of the hierarchical construction information are the importance degrees of the items "first chapter", "second chapter", "third chapter" and "fourth chapter", respectively. That is, in the first hierarchical construction information of the above example, the items "first chapter" and "fourth chapter" are utilized as the importance degrees a and b in the classification, respectively, and other items are not utilized in the classification.

The temporary key word data base is now described in detail. In step 2902 in the case of constructing the first hierarchy or top class, the first hierarchical construction information is used to prepare the temporary key word data base as follows:

First of all, the fact that the items to be utilized in the classification are "the first chapter" and "the fourth chapter" is read from the first hierarchical construction information. In other words, since "the second chapter" and "the third chapter" have the importance degree 0, these chapters are not utilized in the classification and "the first chapter" and "the second chapter" except them are utilized.

Figure 31:
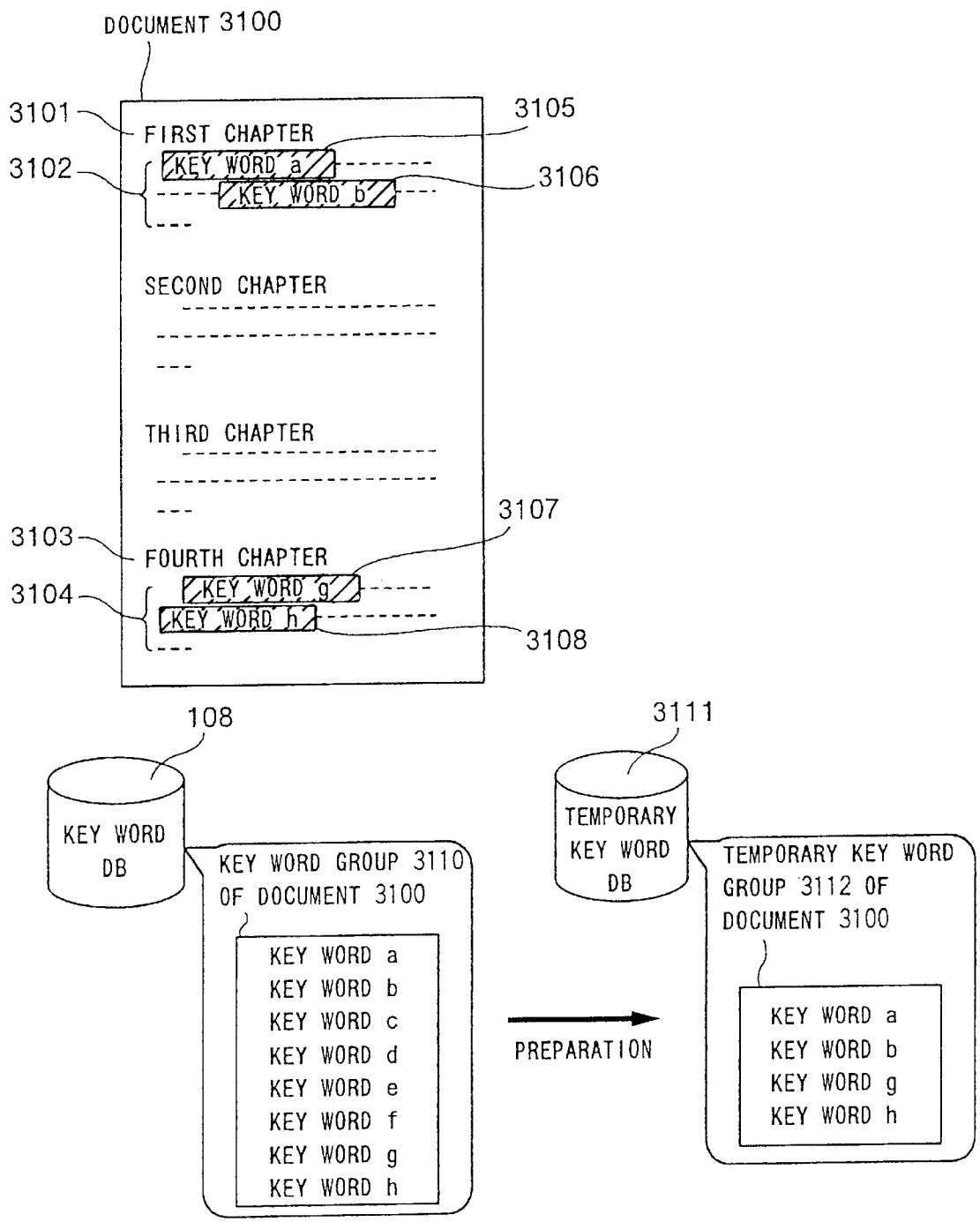
FIG. 31 illustrates a temporary key word data base of the second embodiment.

The key word group of documents are read out from the key word data base 108 and only key words appearing in the items "first chapter" and "fourth chapter" are taken out to prepare the temporary key word group and register it in the temporary key word data base. For example, a key word group of a document 3100 of FIG. 31 is registered as a key word group 3110 in the key word data base 108. In order to prepare the temporary key word group from the key word group 3110, only key words appearing in descriptions 3102 and 3104 annexed to the items "first chapter" 3101 and "fourth chapter" 3103, respectively may be taken out. More particularly, these taken-out key words correspond to key words a 3105, b 3106, g 3107 and h 3108. The temporary key word group 3112 is prepared from these key words and is registered in the temporary key word data base 3111. The single key word classification 2903 utilizes the temporary key word group thus prepared.

The related key word classification process 2904 performed using the hierarchical construction information and the temporary key word data base is now described. In the related key word process 2904 for constructing the first hierarchy (top class), the fact that the key words appearing in the item "first chapter" have the importance degree a and the key words appearing in the item "fourth chapter" have the importance degree b is read from the first hierarchical construction information. The above importance degrees are then added up to the appearance frequencies of the key words included in each document to increase the importance degrees of the key words to be attached importance upon the first hierarchical construction. In this manner, the key words appearing in the items specified by the user are attached importance and classified to thereby be apt to prepare the folders suitable for the hierarchy, so that the classification system having the proper higher and lower relation is prepared.

Figure 41:
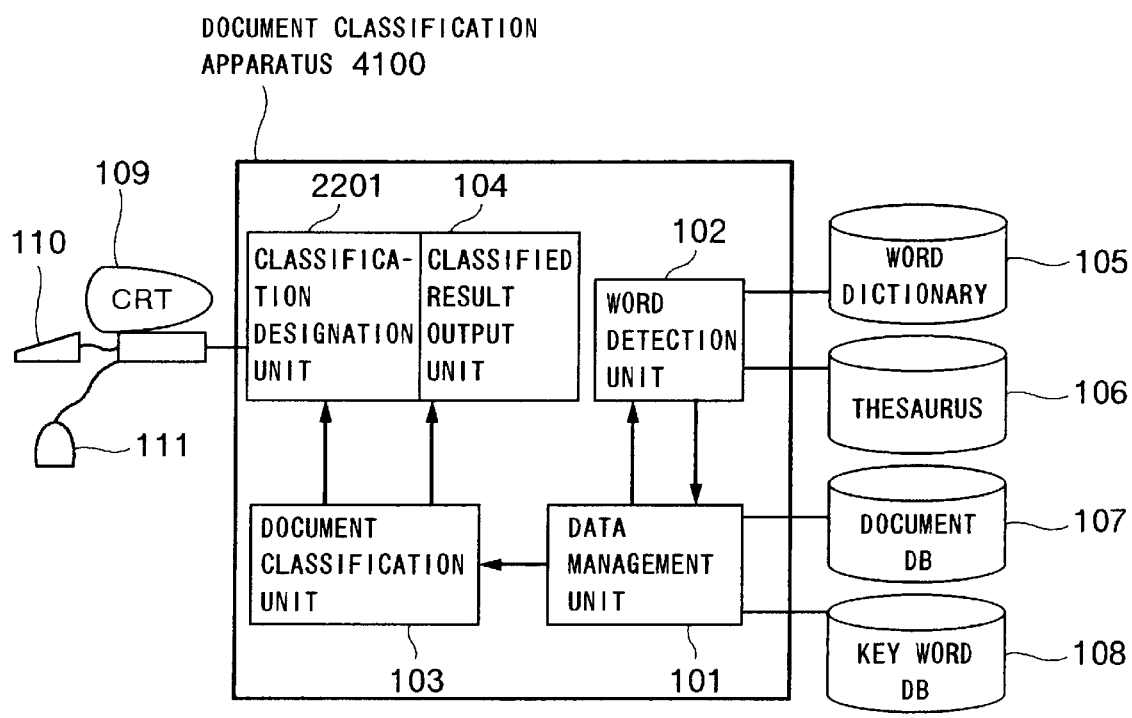
FIG. 41 is a schematic diagram illustrating a system of the third embodiment.

A third embodiment of a document classification apparatus 4100 (shown in FIG. 41) which previously receives instructions relative to the classification from the user in the classification designation unit 2201 described in the second embodiment and performs the classification process on the basis of the received instructions is now described.

Figure 32:
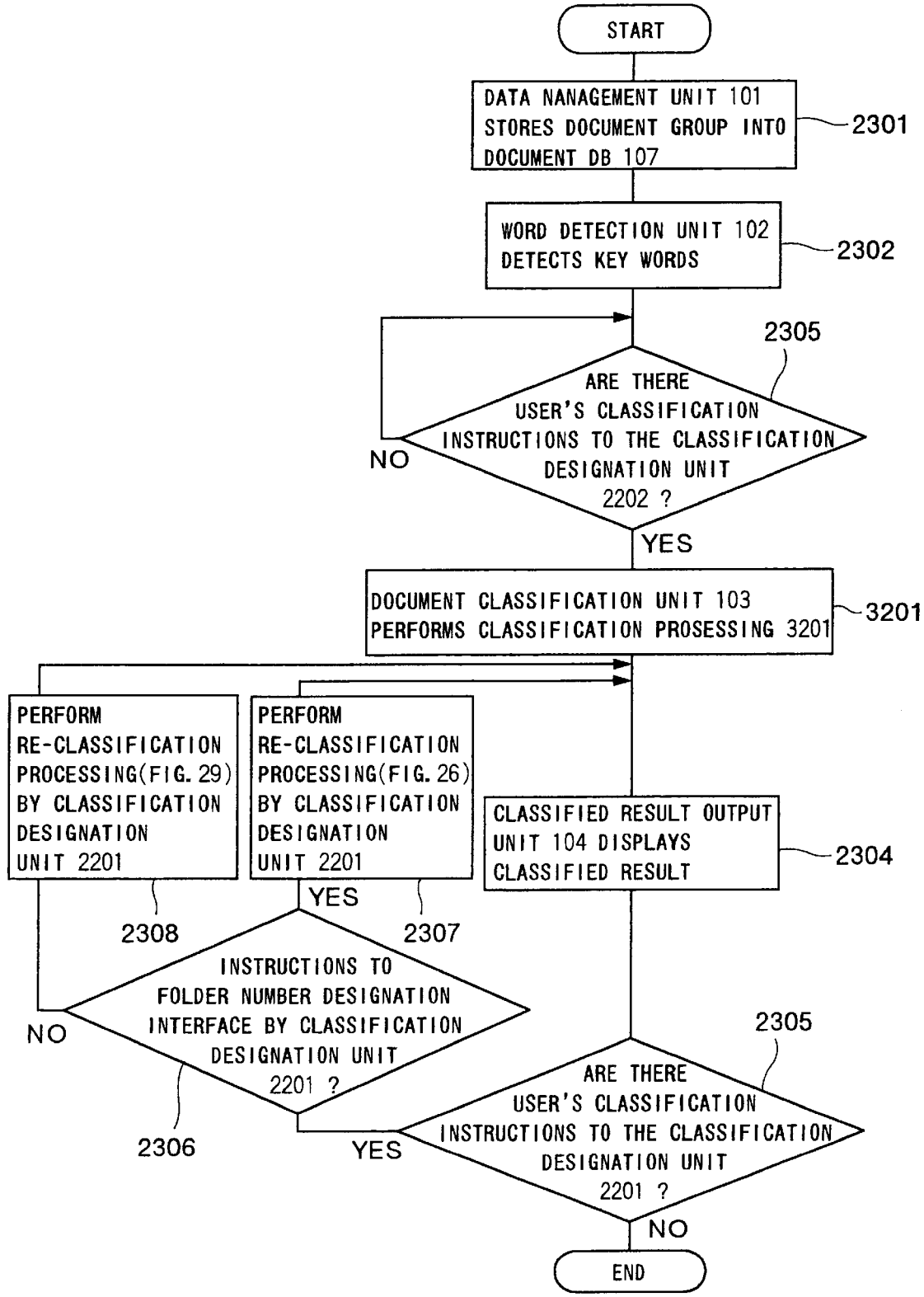
FIG. 32 is a flow chart of a document classification apparatus of a third embodiment.

When the user specifies a document group desired to be classified by using the input device such as the key board 110 or the mouse 111 and instructs execution of the classification process, the document classification apparatus 4100 is started to perform the process based on a flow chart of FIG. 32. In step 2301, the data management unit 101 stores the user's specified document group into the document data base 107.

In next step 2302, the word detection unit 102 detects key words from the document group and stores them into the word dictionary 105. When data for performing the classification process can be prepared, it is confirmed whether there are instructions from the user to the classification designation unit 2201 or not and when there are not any instructions, the process waits for the user's instructions. When there are the user's instructions, the user's instructions are delivered to the document classification unit 103 to perform the classification process 3201.

Detail of the classification process 3201 is described later. In step 2304, the classified result output unit 104 displays the classified result. Further, the classification designation unit 2201 confirms the instructions from the user who refers to the classified result (step 2305) and when there are not any instructions, the process is terminated. When there are the user's instructions, contents of the instructions are interpreted in step 2306 and when the they are instructions to the folder number designation interface 2500, the re-classification process of step 2307 is performed while when they are instructions to the classification system construction assisting interface 2500, the re-classification process of step 2308 is applied. As an example where there are the user's instructions relative to the classification again in step 2305, there is considered the case where the classified result previously specified by the user does not suit the user's convenience contrary to the user's expectations.

Figure 33:
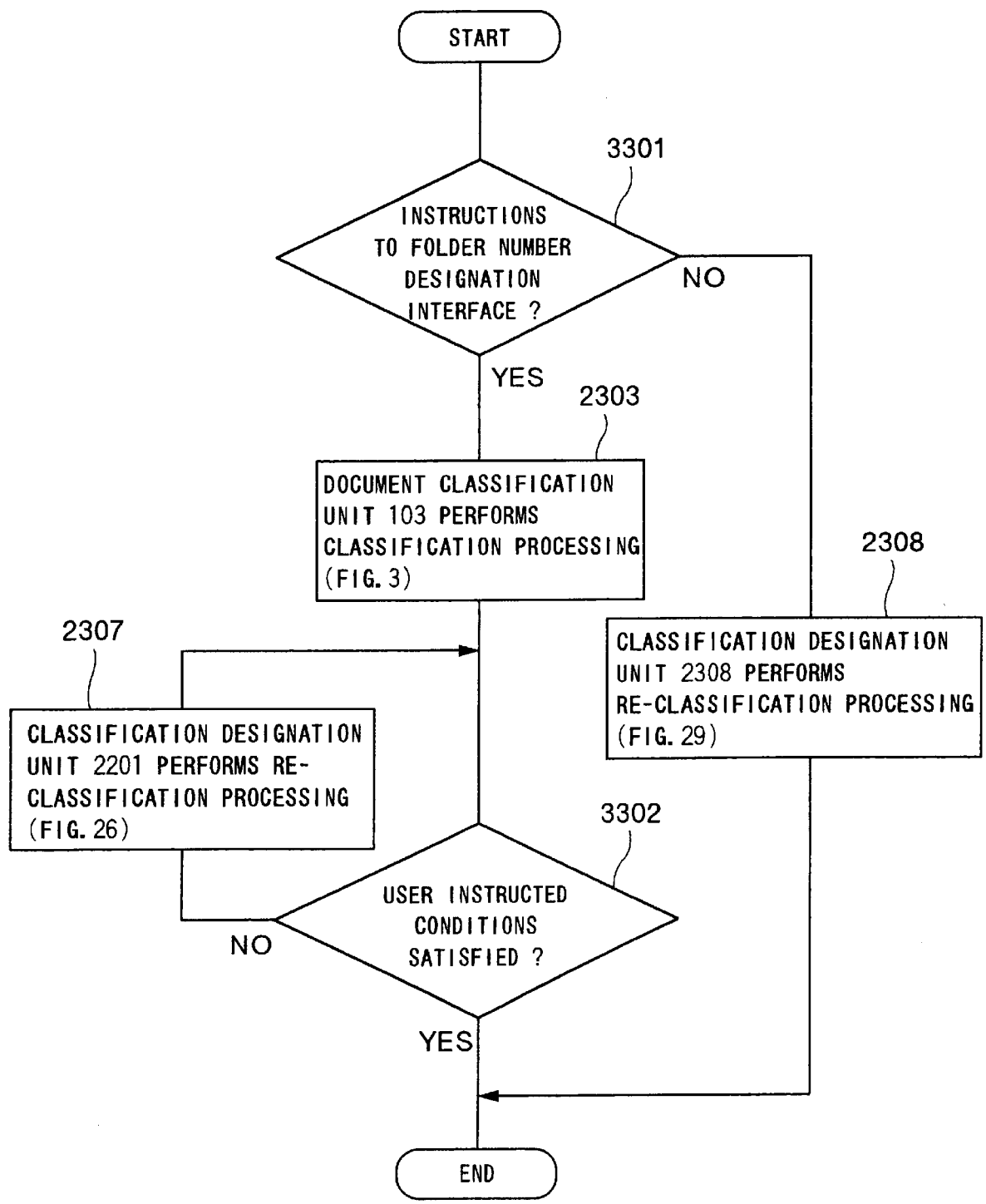
FIG. 33 is a flow chart showing a detail of a classification process of FIG. 32 of the third embodiment.

FIG. 33 is a flow chart showing a definite process of the classification process 3201. In step 3301, it is examined whether instructions are issued to the folder number designation interface 2500 or to the classification system construction assisting interface 2700. In the latter case, the re-classification process 2308 of the classification system construction assisting interface 2700 is performed and the process is terminated. In the former case, the document classification unit 103 prepares the classification system in accordance with the flow chart of FIG. 3 and classifies documents in step 2303. In step 3302, it is confirmed whether the classified result satisfies the user instructed conditions or not. Since the user's instructions to the folder number designation interface 2500 are to designate the number of folders or the average number of documents, whether the classified result satisfying the instructions is obtained or not is examined and when obtained, the process is terminated. When the user's instructions are not satisfied, the re-classification process 2307 of the folder number designation interface 2500 is executed and the classification process 2303 is executed again to satisfy the user's instructions.

A fourth embodiment of a document classification apparatus including means for causing the user to browse the classified result and provided in the classified result output unit 104 of the document classification apparatus 100 of the first embodiment shown in FIG. 1 is now described.

In the document classification apparatus of the first embodiment, the folders prepared as the classified result are quite unknown differently from the case where classification is made on the basis of the previously set classification system. Accordingly, when the user refers to the classified result to retrieve a desired document, it is examined what kind of folder there is. Thus, the user selects a folder in which there is a possibility that a desired document is classified therein and browses the inside of the folder. However, if it takes time to reach the desired document, the user easily browses the inside of the folder when the classification system is fixed. With such a system, the present invention which prepares a proper classification system in accordance with the document to be classified is not utilized effectively. Accordingly, as shown in FIG. 34, a document classification apparatus 3400 including a retrieval supporting unit 3401 in addition to the document classification apparatus of the first embodiment is provided to support browsing of the classified result. The retrieval supporting unit 3401 includes two processing functions of a folder retrieval supporting function 3402 and a document retrieval supporting function 3403.

Figure 35:
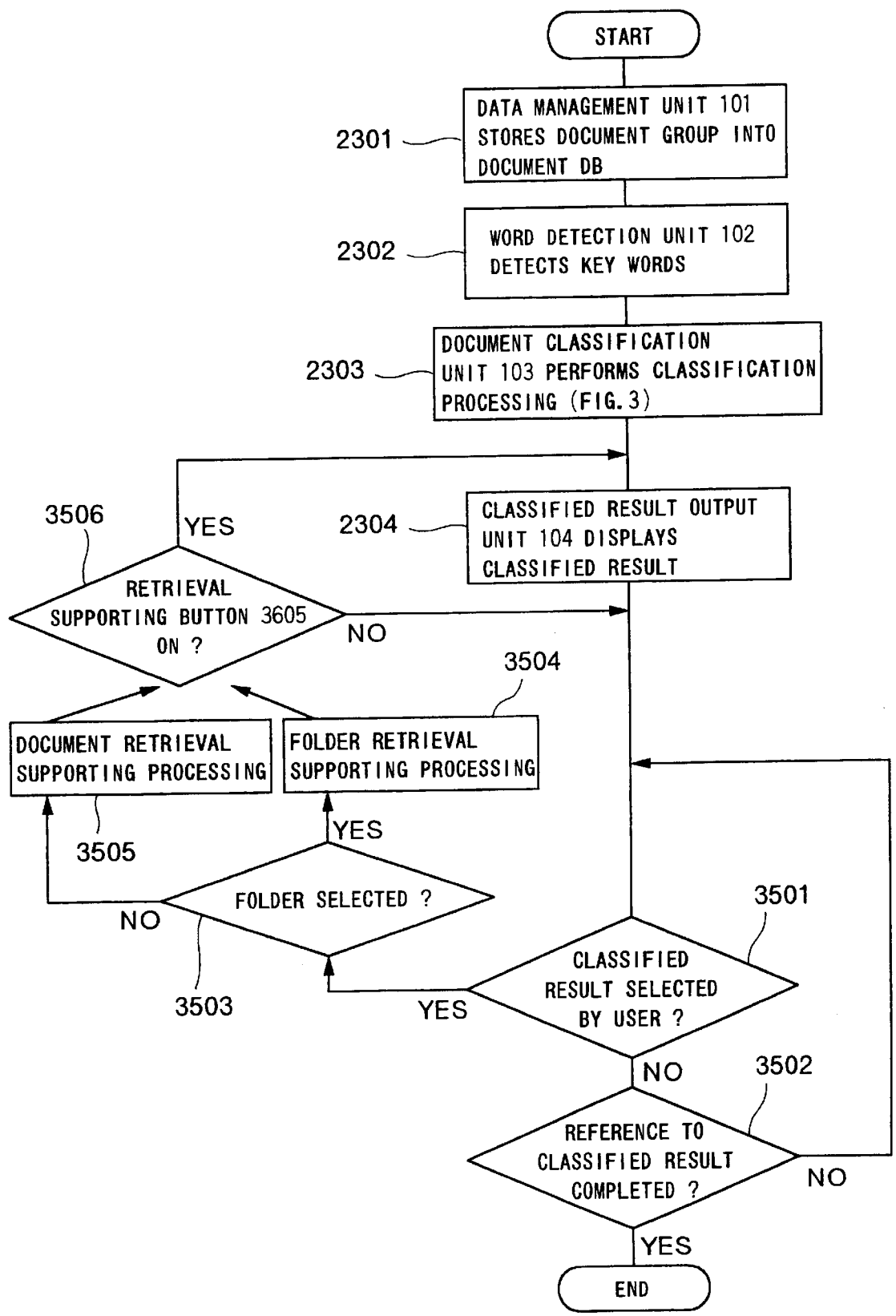
FIG. 35 is a flow chart of a document classification apparatus of the fourth embodiment.

When the user specifies a document group desired to be classified by using the input device such as the key board 110 or the mouse 111 and instructs to execute the classification process, the document classification apparatus 3400 is started to perform the process based on a flow chart of FIG. 35. In step 2301, the data management unit 101 stores the document group specified by the user into the document data base 107.

In next step 2302, the word detection unit 102 detects key words from the document group and stores them into the word dictionary 105. When data for performing the classification process can be prepared, the document classification unit 103 prepares the classification system in accordance with the flow chart of FIG. 3 and classifies documents. The classified result output unit 104 displays the classified result in an interface picture 3600 as shown in FIG. 36 to present it to the user (step 2304).

In FIG. 36, a folder name of the first hierarchy or top class is displayed in 3601, a folder name of the second hierarchy is displayed in 3602, and a folder name of the third hierarchy is displayed in 3603. The processing steps described so far are the same as those of the first and second embodiments. In subsequent step 3501, it is examine whether the user selects any folder or document of the classification situations displayed by the classified result output unit 104 or not. When the user instructs termination of the classified result by an end button 3604 without any selection, the process is terminated (step 3502).

When selection is made, it is examined whether the classified result output unit 104 selects the folder or the document in step 3503. When the folder is selected, the folder retrieval supporting process 3504 is indicated to the folder retrieval supporting function 3402 of the retrieval supporting unit 3401 and when the document is selected, the document retrieval supporting process 3505 is indicated to the document retrieval supporting function 3403 of the retrieval supporting unit 3401. The folder retrieval supporting process 3504 and the document retrieval supporting process 3505 are to process the classified result so that the classified result is apt to be browsed and detail thereof is described later. Further, when the user presses a search supporting button 3605 to require to support browsing of the classified result, the retrieval supporting unit 3401 delivers the processed classified result to the classified result output unit 104 to display the new classified result.

The folder retrieval supporting function 3402 and the document retrieval supporting function 3403 provided by the retrieval supporting unit 3401 are now described in detail.

The folder retrieval supporting function 3402 is to estimate other folders on the basis of the similarity to the folder selected by the user in order that the user refers thereto and re-arrange the folders in order of the similarity. FIG. 36 shows the interface picture 3600 of the classified result produced by the classified result output unit 104 and an auxiliary information picture 3610 produced by the retrieval supporting unit 3401. The folder names of the first hierarchy or top class, the second hierarchy and the third hierarchy are displayed in the interface picture 3600 and the user can select and refer to them. For simplification of description, the folder name is abstracted and shown as "folder a", while the folder name is actually constituted by one or more key words. Auxiliary information relative to the classified result such as the number of folders 3611 and the average number of documents 3612 is displayed in the auxiliary information picture 3610. When the user does not select anything yet, the folders prepared in the first hierarchy are displayed in the picture 3613 with circles having diameters corresponding to the number of documents thereof and are arranged in order of the number of documents. The user selects a desired folder on the basis of the information and refers to the documents classified in the folder.

For example, when the user selects the folder a from the first hierarchy or top class 3601, the classified result output unit 104 informs the folder retrieval supporting function 3402 of the retrieval supporting unit 3401 of it to execute the folder retrieval supporting process 3504. In the folder retrieval supporting process 3504, the similarity of the folder a and other folders of the first hierarchy is examined. The similarity between the folders is judged so that "the more the documents in a folder coincident with the documents classified in the folder a, the higher the similarity of the folder". This is obtained in the related key word process 302 of the document classification unit 103 described in the first embodiment. That is, in the fourth embodiment, this corresponds to the classification process of step 3501 of FIG. 35.

In the folder retrieval supporting process 3504, since the similarity between the folders is required, the information relative to the number of coincident documents between the folders is stored in the classification process 3501 of the fourth embodiment and is provided to the folder retrieval supporting function 3402. Concretely, in step 902 of FIG. 9, contents of the interfolder coincident document number management table 1001 are stored.

Figure 37:
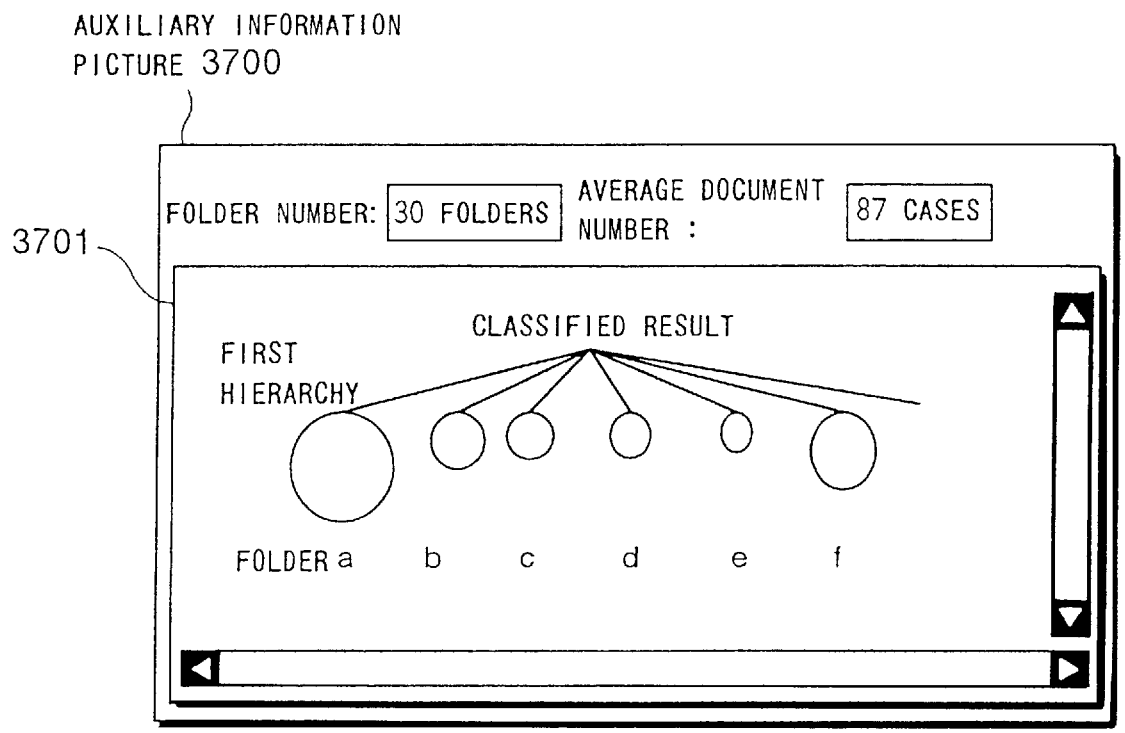
FIG. 37 shows a definite example of a classified result obtained by processing the auxiliary information picture produced by the retrieval supporting unit on the basis of instructions from a user in the fourth embodiment.

For example, in order to examine the similarity of the folder a and other folders, reference is first made to the interfolder coincident document number management table 1001 to take out only a column of the identification number corresponding to the folder a from the folder identification numbers 1002 and 1003. Since the interfolder coincident document number management table 1001 is arranged in order of descent on the basis of the coincident document number, the number of documents coincident with the folder a is increased in a column positioned at the higher-rank location of the table in the taken-out column and the similarity thereof is high. That is, information relative to the folder of the first hierarchy can be taken out in order of the similarity to the folder a. The folder retrieval supporting function 3402 uses these information and rewrites the picture 3613 of the auxiliary information picture 3610 into a picture 3701 of an auxiliary information picture 3700 of FIG. 37. That is, the folders of the first hierarchy are re-arranged in order of similarity to the folder a so that the user easily obtains information relative to the folder similar to the folder a.

The document retrieval supporting function 3403 is now described.

The document retrieval supporting function 3403 is to examine a document similar to a document judged as improper by the user of the documents classified in the folder and exclude the document from the folder to thereby support the retrieval operation of a desired document. FIG. 38 shows an interface picture 3800 of the classified result produced by the classified result output unit 104 and an auxiliary information picture 3810 produced by the retrieval supporting unit 3401. In the interface picture 3800, folder names are displayed in the first hierarchy or top class 3801, folder names of the second hierarchy relative to the folder a selected by the user are displayed in 3802, and a list of document names relative to a sub-folder a is displayed in 3803. The user selects a document a from 3803 and refers to the document a in a picture 3804 in which contents of the document are displayed.

Figure 39:
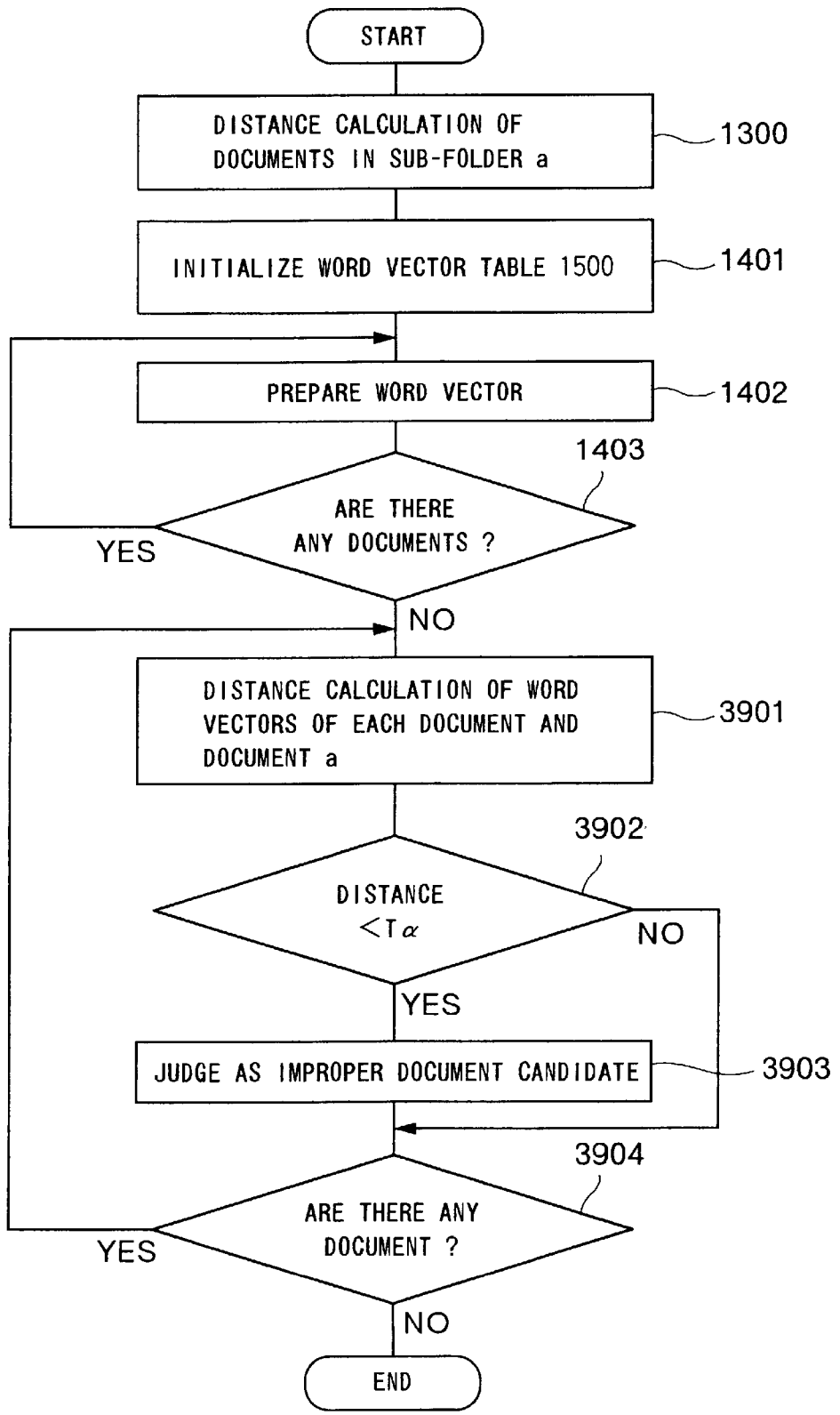
FIG. 39 is a flow chart showing a document retrieval supporting process by a document retrieval supporting function of the fourth embodiment.

A list of documents in the sub-folder a including the document a referred currently by the user and top portions of contents of the documents are displayed in 3811 of the auxiliary information picture 3810. The user browses the classified result on the basis of these information. When the user judges that "the document a is not necessary", for example, as a result of referring to the information and presses a delete button for specifying an unnecessary document, the retrieval supporting unit 3401 informs the document retrieval supporting function 3403 of this information. The document retrieval supporting function 3403 performs the document retrieval supporting process 3505 in accordance with a flow chart of FIG. 39. In order to examine a document similar to the document a judged as unnecessary, the distance calculation process 1405 between word vectors described in the first embodiment is used. As preparation therefor, the distance calculation process of documents in a folder 1300 is performed for the sub-folder a.

Then, in step 1401 of FIG. 14, the word vector table 1500 is initialized and preparation of word vectors in each document is repeated (step 1402 and 1403). The processing steps described so far are the same process as the first embodiment. In next step 3901, the distance calculation process 1405 between word vectors of the first embodiment is performed for the document a and other documents. A distance between documents is similarity and accordingly the similarity between the document a and each document is calculated. Further, in step 3902, documents having a distance between the documents and the document a shorter than the threshold Ta, that is, document having the close similarity to the document a are examined and these documents are regarded as improper document candidates (step 3903). The above process is repeated for the whole documents (step 3904) to select all the documents having the high similarity to the document a.

The retrieval supporting unit 3401 delivers the information relative to the document judged as the improper document candidates to the classified result output unit 104. Thereafter, when the user specifies the retrieval supporting button 3805, the document similar to the document a is excluded from the folder and an interface picture 400 of the classified result of FIG. 40 is prepared newly. The document a and the documents judged as similar to the document a are removed from the sub-folder a and the number of documents is changed from 96 cases (3806) of FIG. 38 to 71 cases (4001) of FIG. 40. 25 documents including the document a and documents d, f and the like judged as similar to the document a are removed from the list of documents 3803 and the list of documents is changed as 4002.

We claim:

1. A document information classification method for classifying each of a plurality of previously stored document information into predetermined classification, said method comprising:

a step of storing said plurality of document information and a plurality of sets of key words included in each document information of said plurality of document information;

a step of comparing the key words with said document information to classify said document information into a plurality of first key-word folders for each stored key word;

a step of comparing document information in said first key-word folders with document information in other key-word folders to combine said first and other key-word folders when a predetermined number of same document information is included in said first and other key-word folders thereby to prepare second key-word folders; and a step of classifying said plurality of previously stored document information into said second key-word folders.

2. A document information classification method according to claim 1, comprising:

a step of comparing document information in said second key word folders with each other to combine said document information having a certain correspondence into third key word folders thereby to classify said plurality of document information.

3. A document information classification method according to claim 2, comprising:

a step of previously designating the number of said second key word folders, and wherein said step of comparing said document information in said second key word folders with each other comprises repeating the combination until said designated number of second key word folders is reached.

4. A document information classification method according to claim 2, comprising:

a step of confirming whether said third key word folders are caused to be continued or not on the basis of contents of each document in said third key word folder.

5. A document information classification method according to claim 1, comprising:

a step of comparing other key words of document information in said second key-word folder with each other thereby to cluster said document information into a plurality of fourth key-word folders for one of said other key-words; and a step of classifying said document information in said second key-word folder into said plurality of fourth key-word folders.

6. A document information classification method according to claim 5, comprising:

a step of previously defining an uppermost number of document information classified into said plurality of fourth key-word folders, and wherein said step of classifying into said fourth key-word folder comprising classifying said document information is repeated until said previously defined number.

7. A document information classification method according to claim 1, comprising:

a step of extracting words appearing in said plurality of previously stored document information, and a step of using said extracted words as said key-words.

8. A document information classification method according to claim 1, comprising:

a step of comparing documents in said first key-word folders with each other to combine said first key-word folders having the number of coincident document information exceeding a predetermined number with each other to prepare said second key-word folders.

9. A document information classification method according to claim 1, comprising:

a step of preparing said second key-word folders by using any one of an appearance frequency and an appearance position of said key-word in said document information.

10. A document information classification method according to claim 1, comprising:

a step of calculating a characteristic vector on importance of each document information in said second key-word folders and calculating an average vector of each of said calculated characteristic vectors, and a step of redividing said document information having a difference between said calculated average vector and characteristic vector exceeding a predetermined value within said second key-word folders.

11. A document information classification method according to claim 1, comprising a step of calculating a characteristic vector on importance of each document information in said second key word folders, and a step of using said calculated characteristic vectors to judge whether said second key word folders are combined or not.

12. A document information classification apparatus including memory means for previously storing a plurality of document information and a key word group in each document information of said document information and classifying said document information, comprising:

first key word processing means for comparing key words of said plurality of document information to classify said plurality of document information into a plurality of first key-word folders for each key word stored in said memory means; and second key word processing means for comparing document information in said plurality of first key-word folders with document information in other key-word folders to combine said first and other key-word folders when a predetermined number of same document information are included in said first and other key-word folders thereby to prepare second key-word folder;

whereby said plurality of previously stored document information is classified into said second key word folder.

13. A document information classification apparatus according to claim 12, comprising:

related key word combination means for composing document information in said second key-word folders with each other to combine said document information having a certain correspondence into third key-word folders thereby to classify said plurality of document information.

14. A document information classification apparatus according to claim 13, comprising:

confirmation means for confirming whether said third key-word folders are caused to be continued or not on the basis of contents of each document information within said third key-word folder.

15. A document information classification apparatus according to claim 12, comprising:

second single key word processing means for comparing other key words of document information within said key-word folder with each other to thereby cluster said document information into a plurality of fourth key-word folders for one of said other key words; and wherein said document information within said second keyword folder is classified into said plurality of fourth key-word folder.

16. A document information classification apparatus according to claim 12, comprising:

extraction means for extracting words appearing in said plurality of previously stored document information; and key word preparing means for using said extracted words as said key words.

17. A document information classification apparatus according to claim 12, wherein said related key word folder processing means compares said document information within said first key-word folders with each other to combine said first key-word folders having the number of coincident document information exceeding a predetermined value with each other to prepare said second key word folders.

18. A document information classification apparatus according to claim 12, wherein said second key-word folders processing means uses any one of an appearance frequency and an appearance position of said key word in said document information to prepare said related key word folder.

19. A document information classification apparatus according to claim 12, comprising:

average vector calculation means for calculating a characteristic vector on importance of each document within said second key-word folders and calculating an average vector of each of said calculated characteristic vectors; and redivision means for redividing said document information having a difference between said calculated average vector and characteristic vector exceeding a predetermined value within said second key word folders.

20. A document information classification apparatus according to claim 12, comprising:

characteristic vector calculation means for calculating a characteristic vector on importance of each document within said second key-word folders; and combination judgment means using said calculated characteristic vector to judge whether said second key-word folders are combined or not.

21. A document information classification apparatus including memory means for previously storing a plurality of document information and a key word group in each document information of said document information and classifying said document information, comprising:

first key-word processing means for comparing key words of plurality of said document information to classify said plurality of document information into a plurality of first key-word folders for each key word stored in said memory means;

second key-word processing means for comparing said document information in said plurality of first key-word folders with document information in other key-word folders to combine said first and other key-word folders when a predetermined number of same document information are included in said first and different key-word folders thereby to prepare a second key word folder; and means for combining said second key word folders specified by an operator with each other;

whereby said plurality of previously stored document information is classified into said second key word folder.

22. A document information classification apparatus according to claim 12, wherein said first key word processing means clusters document information including a string of characters selected by an operator into a first key word folder.

23. A document information classification apparatus according to claim 22, comprising:

a thesaurus for indicating a hierarchical structure of said string of characters; and hierarchical relation construction means for constructing a hierarchical relation of said second key word folder by using said thesaurus.

24. A document information classification apparatus according to claim 22, comprising means for defining similarity between second key word folders on the basis of document information included in said second key word folder; and means for selecting a second key word folder similar to a related key word folder selected by an operator in accordance with said similarity.

25. A document information classification apparatus according to claim 24, comprising:

means for removing document information belonging to and similar to the same second key word folder as document information selected by the operator from said second key word folders.

* * * * *